United States Patent [19]

Hatch

[11] Patent Number: 4,714,381

[45] Date of Patent: Dec. 22, 1987

[54] MACHINE FOR LAYING CONDUIT AND METHODS FOR USE THEREOF

[75] Inventor: G. Brent Hatch, Box 996, 2661 South Hwy. 23, Mendon, Utah 84325

[73] Assignees: G. Brent Hatch; Susan W. Hatch, both of Mendon, Utah

[21] Appl. No.: 729,566

[22] Filed: May 2, 1985

[51] Int. Cl.[4] .............................................. F16L 1/02
[52] U.S. Cl. .................................... 405/178; 405/154; 405/175; 405/179; 405/181
[58] Field of Search ............... 405/154, 170, 174, 175, 405/177, 178, 179, 180, 181, 183

[56] References Cited

U.S. PATENT DOCUMENTS

| | | | |
|---|---|---|---|
| 259,248 | 6/1882 | Wasson . | |
| 332,126 | 12/1885 | White . | |
| 1,814,094 | 7/1931 | Rhodes | 405/179 X |
| 2,633,713 | 4/1953 | Shields . | |
| 2,738,745 | 3/1956 | Harpold | 405/179 X |
| 2,830,548 | 4/1958 | McElvany | 405/179 X |
| 3,292,379 | 12/1966 | McElvany | 405/179 |
| 3,354,661 | 11/1967 | Russell | 405/179 |
| 3,528,255 | 9/1970 | Blinne . | |
| 3,543,522 | 12/1970 | Torti . | |
| 3,605,419 | 5/1971 | Wells | 61/72.5 |
| 3,608,319 | 9/1971 | Quitadamo, Jr. . | |
| 3,664,137 | 5/1972 | Lett | 61/11 |
| 3,778,168 | 12/1973 | Willner | 356/152 |
| 3,849,998 | 11/1974 | Thacker . | |
| 3,849,999 | 11/1974 | Goffey | 61/72.6 |
| 4,002,035 | 1/1977 | Wright | 405/154 X |
| 4,028,902 | 6/1977 | Courson et al. | 61/72.6 |
| 4,200,410 | 4/1980 | Baker et al. | 405/182 |
| 4,244,123 | 1/1981 | Lazure et al. | 37/193 |
| 4,273,196 | 6/1981 | Etsusaki et al. | 172/4.5 |
| 4,289,424 | 9/1981 | Shefbuch et al. | 405/179 |
| 4,310,267 | 1/1982 | Davis | 405/283 |
| 4,362,435 | 12/1982 | Henry | 405/154 |
| 4,462,715 | 7/1984 | Ashbaugh | 405/157 |
| 4,480,942 | 11/1984 | Farrow | 405/154 |

FOREIGN PATENT DOCUMENTS

| | | | |
|---|---|---|---|
| 1091456 | 12/1980 | Canada | 405/175 |
| 3306046 | 8/1984 | Fed. Rep. of Germany . | |
| 1464063 | 11/1966 | France . | |
| 2506114 | 11/1982 | France | 405/175 |
| 653077 | 12/1985 | Switzerland . | |

OTHER PUBLICATIONS

Lewington, "The Drainage Contractor Black Book II," Agri-Book Magazine, (1980), Box 1060, Exeter, Ontario, Canada N0M 1S0.

Spectra-Physics, "910 and 942 LaserLevel" (1984), Construction & Agricultural Division, 5475 Kellenburger Road, Dayton, Ohio 45424.

Griswold Machine & Engineering, Inc., "Go With the Rugged Ones: GME" (1978), Highway M-60, Union City, Michigan 49094.

*Primary Examiner*—David H. Corbin
*Attorney, Agent, or Firm*—Workman, Nydegger & Jensen

[57] ABSTRACT

An apparatus and method for laying conduit within a trench, using a separable boxlike structure with end walls, side walls, a fill bin compartment internal of the boxlike structure for receiving fill material and dispensing fill material onto the bottom of the trench, and a conduit laying compartment through which conduit is fed for positioning on the bottom of the trench. The boxlike structure has a rigidly mounted tow bar which facilitates application of vertical, longitudinal and lateral forces on the boxlike structure to thereby enable an operator of the apparatus to maneuver it on grade and in alignment along the bottom of the trench. The boxlike structure is maintained on grade and in alignment with the assistance of a laser transmitter/receiver assembly and several grade-maintenance features. When an obstacle is encountered, the boxlike structure may be separated into an upper portion and lower portion so that the upper portion can be unconnected and removed from the lower portion. The laying of conduit within the trench can continue using only the lower portion until it is clear of the obstacle and the upper portion can be repositioned on the lower portion. The apparatus may also have a dewatering system, a conduit lowering system, and an assembly for regulating the level of the fill material deposited on the bottom of the trench.

126 Claims, 12 Drawing Figures

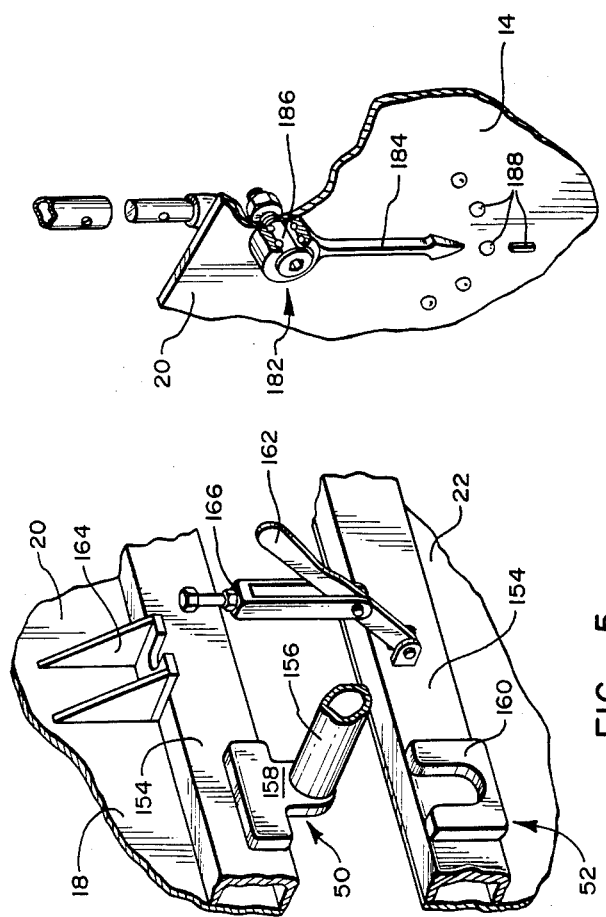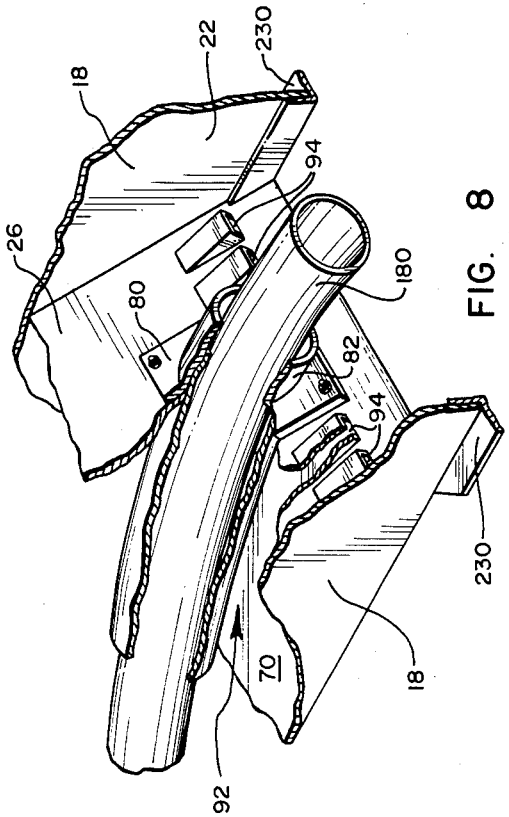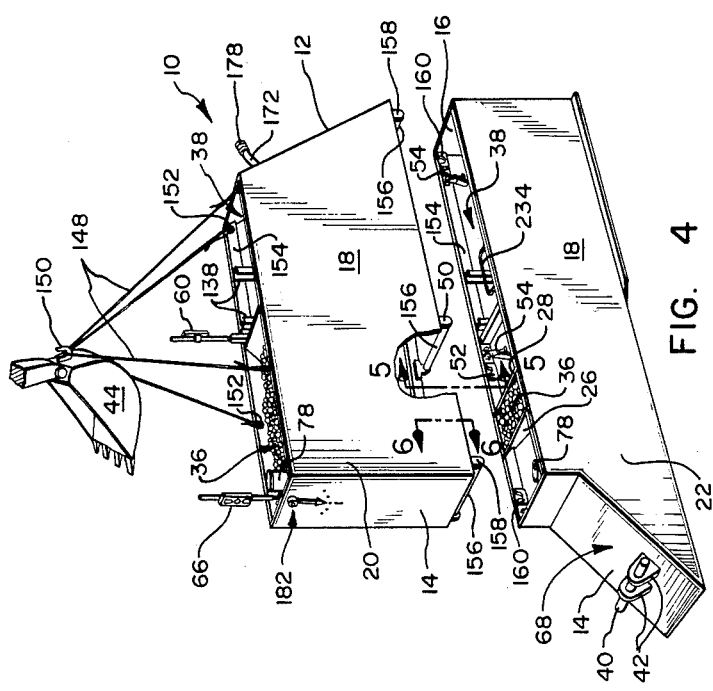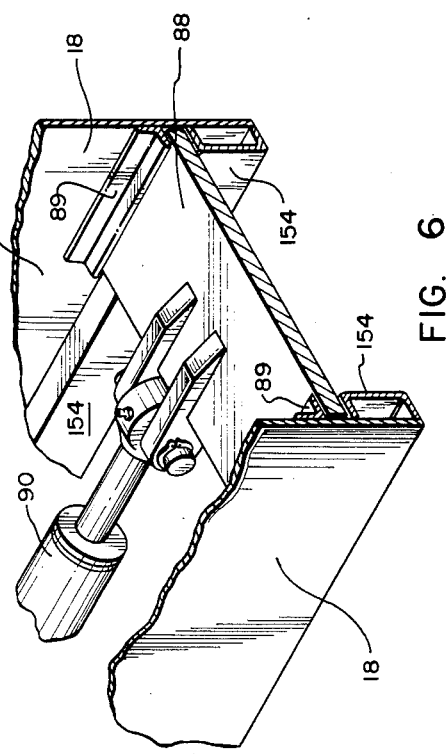

MACHINE FOR LAYING CONDUIT AND METHODS FOR USE THEREOF

FIELD OF THE INVENTION

The present invention relates to an apparatus used for laying conduit in a trench, and more particularly to a trench boot apparatus and features of the trench boot used in and methods used for laying conduit in alignment and on-grade on the bottom of a trench.

BACKGROUND OF THE INVENTION

Various types of apparatus have been used to lay subterranean conduit. Over the years a number of trenching devices have been developed to meet the needs of underground contractors. When doing subterranean work, various types of ground conditions and obstacles are encountered. The ground to be worked may be stable or unstable, it may contain numerous rocks or other obstacles such as utility lines and other underground conduits, or it may have a high water table. Each different type or ground condition requires that the underground contractor pay particular attention to the safety of the workmen and that procedures designed to achieve the greatest efficiency are followed.

Where the ground is stable and maintains its form when a deep trench is excavated therein, excavation and conduit laying can be done quickly and efficiently without significant danger of the trench walls collapsing. Frequently, in stable ground conditions a conduit layer apparatus such as a trencher with a trench boot is used to cut the trench and lay a uniform layer of fill material in the bottom of the trench upon which the conduit is positioned and aligned. Also, since the trench boots have walls to shore up the walls of the trench, the use of a trench boot provides an added safety precaution which protects the workmen within the trench from collapse of the trench walls.

In unstable ground conditions, the use of conduit laying apparatus such as trench boots or trench boxes becomes more critical. Unstable ground is more prone to collapse into the trench. This creates significant problems to underground contractors. Life and limb of the workmen within the trench can be endangered by collapsing trench walls. Further, it is not infrequent that progress in laying conduit is slow and tedious, because delays are caused by collapsing walls and other problems caused by the unstable ground.

When a trench boot or trench box is not used in unstable ground conditions, the walls of the trench must be sloped back at an angle of repose such that the walls are not likely to collapse into the trench. This means that the excavator must remove considerably more earth from the trench, causing time delays and added expense. For example, if the instability of the ground required that the trench walls to be sloped back 45 degrees, for a trench two (2) feet wide and ten (10) feet deep, the excavator must remove 120 cubic feet of earth for each foot of length of the trench. This is an additional 100 cubic feet in excess of the 20 cubic fee for the needed trench. In this instance, excavator time is increased five-fold, and since the use of heay equipment is quite expensive, the cost of the trenching project is also increased tremendously.

In rocky ground or earth containing obstacles such as utility lines, the underground contractor encounters different and challenging problems. Certain kinds of excavating implements cannot be efficiently used or used without damage either to the implement or the utility line. This severely limits the efficiency of the underground contractor in laying conduit within a trench. In some instances, the use of certain types of excavators and trench boxes becomes cost prohibitive due to the time delays involved in working around obstacles within the trench.

Unique types of problems are represented where the conduit to be laid is in an area where there is an extremely high water table. As rapidly as the trench is excavated, it begins to fill with ground water which makes it extremely difficult to lay a fill material bedding or the conduit in the bottom of the trench. In some instances, continuous pumping of the ground water from the trench is futile.

As can be easily seen, the laying of subterranean conduit presents many and varied problems for the underground contractor. Consequently, over the years, there have been a number of implements and apparatus which have been developed to assist the underground contractor in laying conduit within a trench. There have been trench boxes and trench boots utilized with many different types of excavating implements and in a variety of contexts.

For example, there were ditching and tile laying machines which were developed as early as the 1880's in which a plow opened a ditch into which the tile was to be laid. A hopper or chute was attached behind the plow through which tiles were fed and delivered to the bottom of the ditch and a fill material was carried down the chute to cover the positioned tile. However, the plow/hopper apparatus had significant limitations. The ditch created was not very deep because as the plow was placed deeper beneath the ground surface it became more difficult to pull the plow through the earth. Further, many a plow has been broken upon striking a rock hidden below the surface. More importantly, it was extremely difficult to lay tile in a straight line because plows have a tendency to move and deflect along a path of least resistance. Because of the limitations of laying tile using plows to dig the ditch, other types of trenching apparatus were developed.

Later, as trenchers with trenching booms were developed it became easier to dig trenches in alignment by moving a minimum amount of earth. The trenching boom of a trencher is lowered into a trench to the desired depth and digging bucket mechanism adapted for digging an elongated, earthen trench is used to cut the trench in which the conduit is to be laid. The efficiency of the underground contractor was improved tremendously by the advent of trenchers, particularly where the trench was to be excavated under stable ground conditions. The trencher could remove only the earth necessary to open the appropriate size of trench.

However, under unstable ground conditions, the walls of the trench frequently would sluff into the trench behind the trencher boom before conduit could be laid. To minimize this problem trench boots were developed. The trench boots were typically boxlike apparatus attached behind the trench boom. The development of trenchers with trench boot mobile housings which followed behind the digging bucket mechanism of the trencher boom within the trench became an integral part of efficiently laying conduit within a trench. Illustrative examples of the type of trench boots developed to be used in conjunction with trenchers are U.S. Pat. No. 3,605,419, issued to M. E. Wells, Sept. 20, 19871, entitled "Method and Apparatus for Laying Pipe," and U.S. Pat. No. 4,028,902, issued to Courson et al., June 14, 1977, entitled "Apparatus for Laying Elongated Flexible Tubing." However, most trench boots used with trenchers are designed to lay only flexible pipe.

Despite the usual efficiency of trench boots used with trenchers, there are certain types of ground conditions and obstacles encountered which make the use of a trencher unfeasible. For example, it is not advisable to use a trencher to excavate a trench in areas where there are numerous utility lines. Each time a utility line is encountered, the trenching boom with the trench boot attached thereto must be removed from the trench and the earth surrounding the utility line must be cleared away, either manually or using some other type of excavating implement such as a backhoe. Thus, additional heavy equipment must be continuously on call to relieve the trencher when a utility obstacle is encountered. This significantly increases the cost of the project and decreases the efficiency of the underground contractor.

More importantly, it is not unusual in such instances that the operator of the trencher will sever utility lines within the trench. This interjects tremendous delays and can be extremely dangerous. The utility lines must be repaired before the conduit-laying project can continue. The utility company must be notified and the subterranean work ceases until a utility company crew can repair the problem. Furlther, if the utility line severed is a gas line, there is a serious chance of an explosion and the work area as well as the surrounding area may have to be evacuated until the problem is remedied.

Independent of those types of problems, since the trench boot must be removed from the trench, the pipe must be laid manually at the bottom of the trench without the safety of the trench boot walls. Consequently, in the vicinity of the utility line it is not uncommon that the walls of the trench must be sloped back at an angle of repose sufficient to assure that the walls of the trench will not collapse on the workers as they are manually laying the conduit. This can involve moving tremendous amounts of earth causing additional delays. Once the conduit is laid beneath the utility obstacle the trencher with the trench boot attached can be lowered into the trench and excavation can recommence. However, if another obstacle is encountered, the same tedious and time consuming process must be undertaken. For these and other significant reasons, use of a trencher with a trench boot attached thereto frequently is not the most cost effective way to lay conduit.

Trench boxes have been designed to assist in laying conduit in areas where it is not advisable to use a trencher. Trench boxes usually comprise spaced walls supported by transverse rods which hold the walls in a spaced relationship. When a deep trench is required, the trench boxes are merely stacked one on top of the other until the desired height is reached. The walls of the trench box provide the abutment against which the walls of the trench would fall in the event of a collapse. In this manner workers within the trench box are protected from trench wall collapse.

Under stable ground conditions, it is not unusual that the excavating machine (e.g., a backhoe) can excavate a trench in advance of the trench box. The trench carved out of the earth is necessarily wider than the trench box and once the conduit is laid on the bottom of the trench within the trench box, the trench box may be advanced for continuing the conduit-laying procedure.

Under unstable ground conditions, the use of a trench box becomes much more complex. Excavation of the trench in advance of the trench box is not feasible because the walls of the trench tend to collapse before the trench box can be advanced. As a result, conditions may require that a different method be used. One method that has been used involves placing the trench box on the surfsace of the ground where the trench is to be excavated. Earth is excavated from within the trench box and the trench box is tapped down into place gradually as the earth within the trench box is removed. This procedure is continued until the trench box is located at the desired depth. The conduit can then be laid within the trench box on the bottom of the trench. To advance the trench box, the underground contractor cannot remove the trench box from the trench because the unstable walls of the trench may collapse about the freshly laid conduit before the connecting conduit can be laid. Therefore, to lay additional conduit the trench box is pulled forward and its forward end titled at an angle because it rests on unexcavated earth. Then, more earth is excavated from within the trench box. The forward end of the trench box is tapped down until it reaches the desired depth and levels off with the rear of the trench box. Additional conduit can be laid once the trench box reaches the desired depth. This procedure is performed repeatedly until the desired distance of conduit is achieved.

If a utility line is encountered the trench box usually must be removed from the trench and the area around the utility must be cleared so that conduit can be laid manually in the vicinity of the utility obstacle.

Further, with most trench box apparatus there is no facility for automatically laying a fill material bedding on-grade upon which the conduit can be laid. Usually, the fill material must be leveled manually before the conduit can be positioned. Consequently, although in some instances it may be more cost effective to use a trench box to lay conduit under certain ground conditions, it is still an extremely time consuming, difficult and expensive procedure.

Additional problems are created when ground water rapidly fills the trench. With most trench boxes, there is no facility to handle such seepage and pumps are frequently used to extract as much of the ground water as possible. Where the water table is extremely high, the use of a trench box may not be as effective because the ground water moves the soil in too rapidly to allow the laying of the conduit.

One device which has been developed to extract ground water from a trench is illustrated in U.S. Pat. No. 4,462,715, issued to Ashbaugh, July 31, 1984, entitled "System for the One-Step Dewatering of a Trench and the Construction of a Pipeline Bed." The device used is a stone-filled box which is pushed along the trench in increments as the trench is excavated ahead of the box. Simultaneously, the box dispenses stone out the rear end of the box to form a bed which shores up the side of the trench and upon which conduit can be laid. A pump is provided inside the stone-filled box to extract water which has seeped into the box. With this device, however, the conduit is laid on the bed of stone discharged from the stone-filled box. Consequently, if the trench is quite deep or if the water table is quite high the sides of the trench may collapse or water may seep into the trench and the bedding layer before conduit can be laid.

Despite the development of various types of devices, trench boots used in conjunction with trenchers, trench boxes, trench hoppers or chutes following plows and other types of devices, there are some problems that heretofore have remained unsolved. For example, it is extremely difficult to maintain grade and alignment of conduit being laid in a deep trench. In the past, grade and alignment have been matters of estimation and approximation by the underground contractor or the worker operating the trenching devices. As more sophisticated technology became available, it became possible to use lasers in the bottom of a trench to assist in alignment and maintaining grade. However, in-trench laser systems cannot always be used to accurately align a conduit or maintain it on-grade, particularly where severe conditions exist because water and/or sand move into the conduit and deflect or obstruct the laser beam.

Also, the normal procedure for conduit laying, as outlined in the "Caterpillar Equipment Performance Guide Book" is for an excavator to dig a portion of the trench and then to sit idle while the conduit is set. Once the conduit is set, the excavator commences digging on the next portion of the trench. With this procedure, the excavator is actually digging only about half the time.

The handling of the conduit itself has also presented problems. Where the conduit is heavy cement sewage pipe, it is difficult for one worker to lower the pipe into the trench, or to position the pipe, particularly when the trench is rather deep. When the pipe is flexible pipe it is critical that the pipe be delivered to the bottom of the trench in a manner which will not kink or damage the pipe. Since different types of pipe or conduit present different types of problems, heretofore there has not been a trench boot or trench box which readily enables the underground contractor to simultaneously lay two types of conduit, namely flexible and rigid conduits.

Thus, although there have been a number of developments in trench boots and boxes which assist in the laying of conduit within a trench, it would be an improvement to provide an apparatus in which laying subterranean conduit under a variety of ground conditions would be efficient and economically justifiable. It would be an improvement to provide a structure which could be separated quickly and easily to avoid obstacles such as utility lines within a trench while still permitting conduit to be laid with the assistance of that structure in the vicinity of and beneath the utility line. It would be a further improvement to provide an operations-efficient apparatus which can be operated to significantly reduce the amount of earth that must be excavated from and back filled into a trench, and which requires a minimum of large excavating equipment, and permits such excavating equipment to be engaged in the trench-digging function almost continuously. It would be another improvement to provide an apparatus which would have dewatering capability to assist in the laying of conduit in areas with high water tables. It would be still another improvement to provide a conduit lowering system which would automatically deliver and align conduit within the trench. It would be a further improvement to provide a grade and alignment system, heretofore not provided with trench boxes, which would increase the operator's ability to maintain the apparatus on-grade and in alignment. It would be another improvement to provide an apparatus which would permit more than one type of conduit to be laid in alignment and on-grade simultaneously. It would be still another improvement to provide an apparatus which dispenses the exact amount of fill material desired into the trench at the proper time and place, thereby eliminating waste of labor, material and equipment time.

OBJECTS AND BRIEF SUMMARY OF THE INVENTION

In view of the foregoing needs and problems experienced by underground contractors and workmen in laying conduit within a trench which make trench boots and trench boxes desirable, it is a primary object of the present invention to provide an improved trench boot apparatus that can be separated quickly and easily to avoid utility lines in a trench while still providing apparatus to assist in the laying of conduit in the trench.

It is another object of the present invention to provide an apparatus for the laying of conduit within a trench in which a grade and alignment system is provided to assure that the conduit is laid on a uniform bed to fill material in alignment and on-grade.

A further object of the present invention is to provide an apparatus for laying conduit within a trench in which a dewatering system is provided for extracting ground water which seeps into the apparatus.

Yet another object of the present invention is to provide an apparatus for laying conduit within a trench in which a mechanism is provided to assist in the lowering of conduit into the trench for positioning in alignment and on-grade.

Still another object of the present invention is to provide an apparatus for laying conduit within a trench which enables the underground contractor to simultaneously lay different types of conduit.

A further object of the present invention is to provide a sturdy apparatus for the laying of conduit within a trench and for shoring up the walls of the trench thereby providing safety to the workers within the trench and preventing damage to the conduit caused by collapsing trench walls.

Another object of the present invention is to provide an apparatus which can be separated into easily stackable components thereby facilitating easy transport of the apparatus from one job site to another.

The foregoing objects are accomplished by the apparatus of the present invention which is used for laying conduit within a trench and which comprises a boxlike structure having side walls and end walls. The boxlike structure has internal compartments and is separable into an upper portion and a lower portion. The compartments comprise at least a fill bin compartment for receiving fill material and dispensing the fill material on the bottom of the trench, and a conduit laying compartment partially open at its top and bottom through which conduit is lowered and positioned.

The apparatus of the present invention is advanced through the trench by use of a tow bar rigidly mounted to the forward end wall of the boxlike structure. The tow bar is spaced from the forward end wall by mounting brackets thereby enabling the bucket of a backhoe or other excavator to grasp the tow bar and maneuver the boxlike structure by applying pulling, upward or downward force upon the tow bar and/or forward wall of the boxlike structure. This configuration for the tow bar allows the excavator to quickly attach itself to and maintain positive control of the boxlike structure, and to release quickly so as to recommence excavation. In this manner, the boxlike structure can be lifted or lowered while advancing the boxlike structure to make adjustments necessary to maintain it on-grade.

An assembly by which the upper portion of the boxlike structure is secured in nesting engagement to the lower portion of the boxlike structure is provided so that the upper portion rests perfectly aligned and flush with the lower portion. The assembly comprises a series of transverse rods extending below the lower edge of the upper portion of the boxlike structure. The transverse rods are connected to the upper portion by U-shaped brackets which nest in, and register with, U-shaped cups mounted within the lower portion of the boxlike structure. Latches are provided to secure the lower portion to the upper portion.

In a preferred embodiment of the present invention, the boxlike structure has an angled nose which extends forward inclining downwardly to a cutting edge and is located on the lower portion of the boxlike structure. This angled nose assists in shearing the bottom of the trench on grade, and provides an incline upon which the tow bar can be conveniently mounted for easy access by an excavating implement. The freshly sheared bottom of the trench is ready to receive fill material at whatever uniform thickness is desired. Thus, there is no need to over excavate the trench to assure a proper bed of fill material.

With another preferred embodiment of the present invention, the boxlike structure has an enclosed compartment with a floor which extends from the angled nose to the point at which fill material is discharged from the fill bin compartment into the trench. This enclosed compartment provides a water collection area to assist a dewatering system in removing ground water which seeps into the boxlike structure. Vent openings in the enclosed compartment permit ground water to flow into the enclosed compartment where a pump or suction screen can be used to extract the ground water which accumulates within the enclosed compartment. Also, the enclosed compartment may comprise a feed tunnel whereby flexible conduit can be fed into the feed tunnel for discharge into the layer of fill material near the floor of the enclosed compartment. Thus, flexible conduit can be fed through the enclosed compartment to disposition at the bottom of the trench within an envelope of fill material while other conduit is being simultaneously laid on top of the fill material bed.

Several additional features can be provided for the apparatus of the present invention which assist in the laying of conduit in alignment and on-grade. The apparatus may further comprise a leveler gate which strikes off the fill material at a predetermined trench depth. It is preferred that this leveler gate be automatically operated to adjust its position to compensate for movement off grade. Movement off grade is detected by use of a laser transmitter disposed outside the trench which provides a signal received by a laser receiver mounted on the apparatus of the present invention. The laser receiver determines if the apparatus is off grade, and if so, it actuates a mechanism which causes the leveler gate to raise or lower accordingly.

In another preferred embodiment, the laser transmitter also provides an alignment beam which strikes a target mounted on the apparatus. The operator of the apparatus watches the target for a visual display whether the apparatus is in alignment and on-grade. To make adjustments, the operator causes the bucket of the excavating implement to apply upward, downward or lateral force at the tow bar to compensate for any misalignment or to correct the amount off-grade.

Another feature that can be provided is a fill material notcher which provides a notch in the surface of the fill material bed being laid on the bottom of a trench to accommodate the bell end of a conduit having a bell. A notching gate is provided which carves into the fill material to create a notch. It is preferred that the notching gate be mounted on the leveler gate and that it be automatically operated to place the notch in the proper position. To accomplish this a roller arm is provided which travels the top surface contour of a previously laid conduit section. When the roller arm encounters the bell of the previously laid conduit a signal actuates the notching gate to extend it below the leveler gate thereby carving a notch in the fill material. The notch in the fill material is thus positioned to accommodate the bell of the next conduit to be positioned at the bottom of the trench.

Still another feature of the present invention is a conduit lowering assembly which lowers the conduit into the boxlike structure in a manner such that it is aligned and readied for setting with previously laid conduit. The lowering assembly comprises a grasping mechanism which grasps a conduit section to be lowered into the apparatus. The grasping mechanism comprises a guide tube within which a sliding member is disposed. A clamp which grasps the barrel portion of the conduit is connected to the guide tube. The sliding member has a hook end which supports the bell portion of the conduit. Once the grasping mechanism is lowered into the boxlike structure, it can be advanced rearward into setting engagement with the previously laid conduit either manually or by a push arm which engages and pushes the bell portion of the conduit. As the conduit is being pushed forward the sliding member slides within the guide tube, the clamp is released, and the hook is released from its supporting engagement such that the grasping mechanism can be removed from the conduit without disturbing the positioning of the conduit.

The grasping mechanism is lowered into the boxlike structure of the apparatus by a lowering mechanism comprising vertical rails in which a support structure moves vertically upward and downward. The support structure has support arms upon which the grasping mechanism is placed. By placing the grasping mechanism in notches provided in the support arms, the conduit is centered and aligned with the previously laid conduit.

The apparatus of the present invention provides the underground contractor with tremendous versatility. The apparatus can be used in stable or unstable earth and can significantly reduce the time it takes to lay conduit in rocky ground, ground with a high water table, or ground containing utility lines. Under stable ground conditions, the apparatus provides shoring walls to protect workers from collapse of the trench walls and a self-dispensing system for the rapid delivery of a fill material to the bottom of the trench. Under unstable ground conditions, the operator of the apparatus need only clear away sufficient earth to enable the operator to pull the apparatus forward. The angled nose and floor assist in shearing the trench to its proper dimensions. With regard to ground conditions having a high water table, the walls of the boxlike structure prevent ground water from seeping laterally into the conduit laying area. Further, the floor provides a barrier to the ground water which enables the operator to lay a uniform layer of film material on the bottom of the trench before there is an opportunity for water seepage. Also, much of the water that may eventually seep into the boxlike structure passes through vent openings into the enclosed compartment from where it can be collected and pumped from the bottom of the trench.

For conduit being laid in areas having utility lines, the apparatus of the present invention is particularly useful. The excavator clears the earth from around the utility line. A fill material shut-off gate is closed to prevent spillage of fill material from the upper portion of the boxlike structure. Then the latches securing the upper portion of the boxlike structure to the lower portion are released so that the upper portion may be lifted from the lower portion and removed from the trench. The lower portion then can be pulled beneath the utility line. This lower portion provides shoring walls and a work area to facilitate the laying of conduit on the bottom of the trench beneath the utility line. After the utility line has been cleared, the upper portion of the boxlike structure may be repositioned squarely on top of the lower portion and secured thereto for further installation of conduit.

BRIEF DESCRIPTION OF THE DRAWINGS

For a more complete understanding of this invention, reference should now be made to the embodiments illustrated in greater detail in the accompanying drawings and described below. In the drawings:

FIG. 4 is a perspective view of the apparatus with the upper portion thereof being lifted clear of the lower portion and showing the mechanism by which the upper portion aligns and nests squarely in the lower portion;

FIG. 5 is an enlarged cut-away view along line 5—5 of FIG. 4 showing an engagement member in register with a receiving member and a latch used to secure the upper portion to the lower portion of the apparatus;

FIG. 6 is an enlarged perspective cut-away view along line 6—6 of FIG. 4 showing the fill material shut-off gate of the present invention;

FIG. 7 is an enlarged cut-away view of a tilt indicator mounted on the forward end wall of the apparatus of the present invention;

FIG. 8 is an enlarged perspective cut-away view showing vent openings on an interior transverse wall near the bottom of the apparatus and also showing the discharge end of the flexible conduit feed assembly with a flexible conduit being discharged therethrough;

DETAILED DESCRIPTION OF THE PREFERRED EMBODIMENTS

Figure 12:
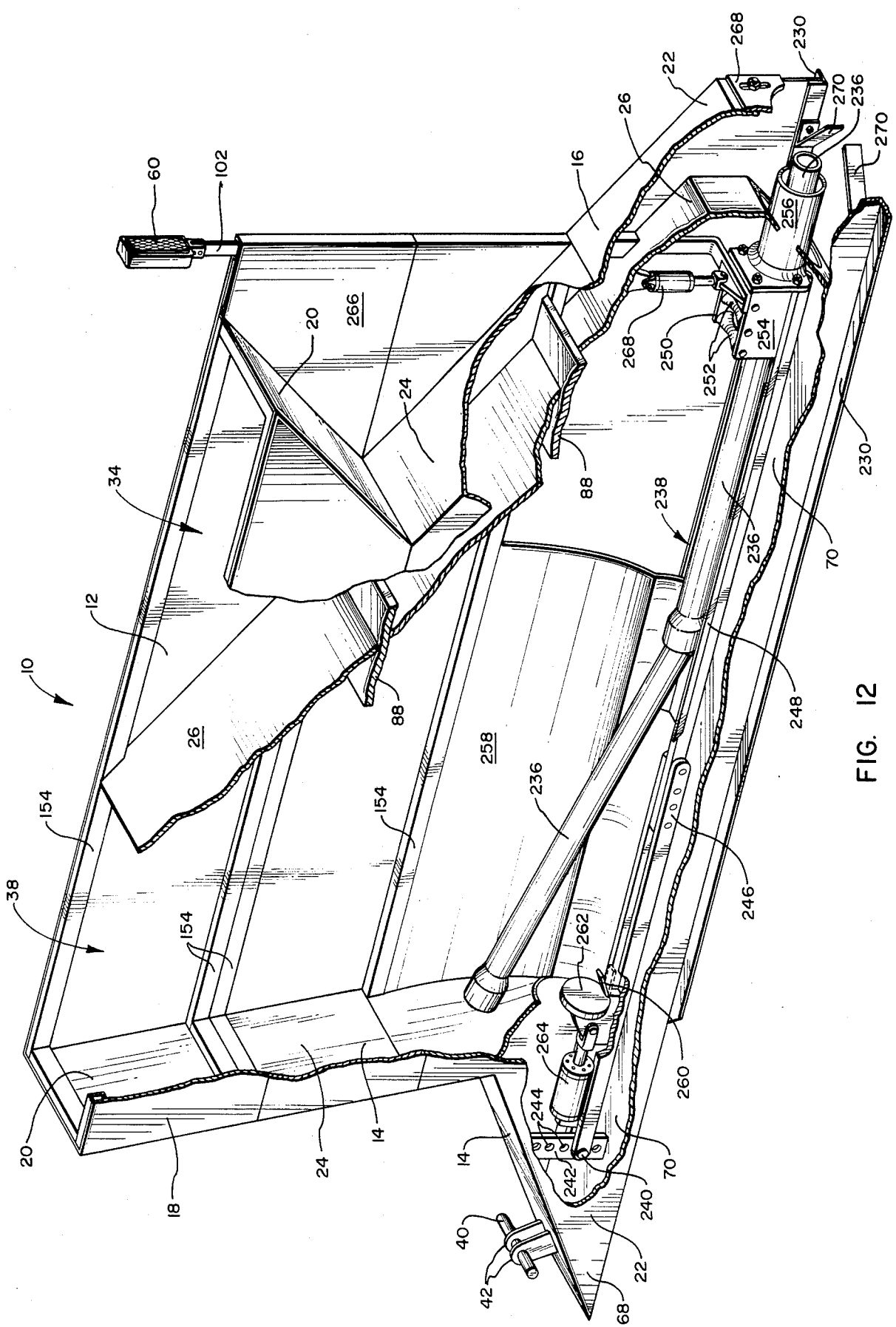
FIG. 12 is a perspective view of an alternative embodiment of the present invention with a side and end wall partially cut away to illustrate the internal components thereof.

Referring now specifically to the drawings, wherein like numerals indicate like parts throughout, the apparatus for laying conduit within a trench in generally designated 10 and comprises a boxlike structure 12 having forward and rear end walls 14 and 16 and side walls 18. The boxlike structure 12 is configured to separate into an upper portion 20 and a lower portion 22. Of course, it should be understood that the boxlike structure 12 may separate into more than two portions, such as illustrated in FIG. 12 wherein an intermediate portion 24 is illustrated.

Figure 2:
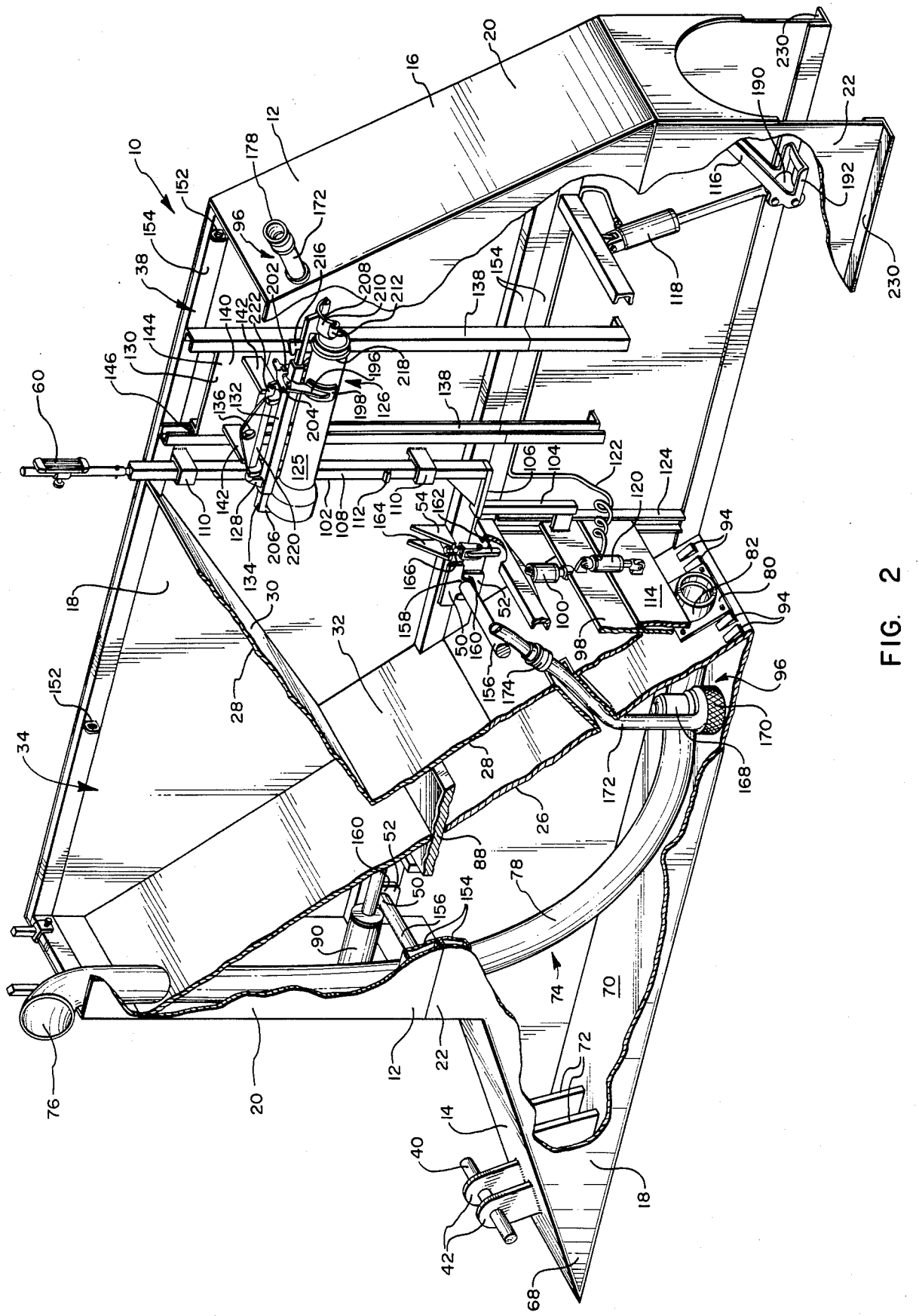
FIG. 2 is a perspective view of the apparatus with a portion of the side wall cut away so that the various features internal of the apparatus can be shown in their relative disposition to each other.
Figure 3:
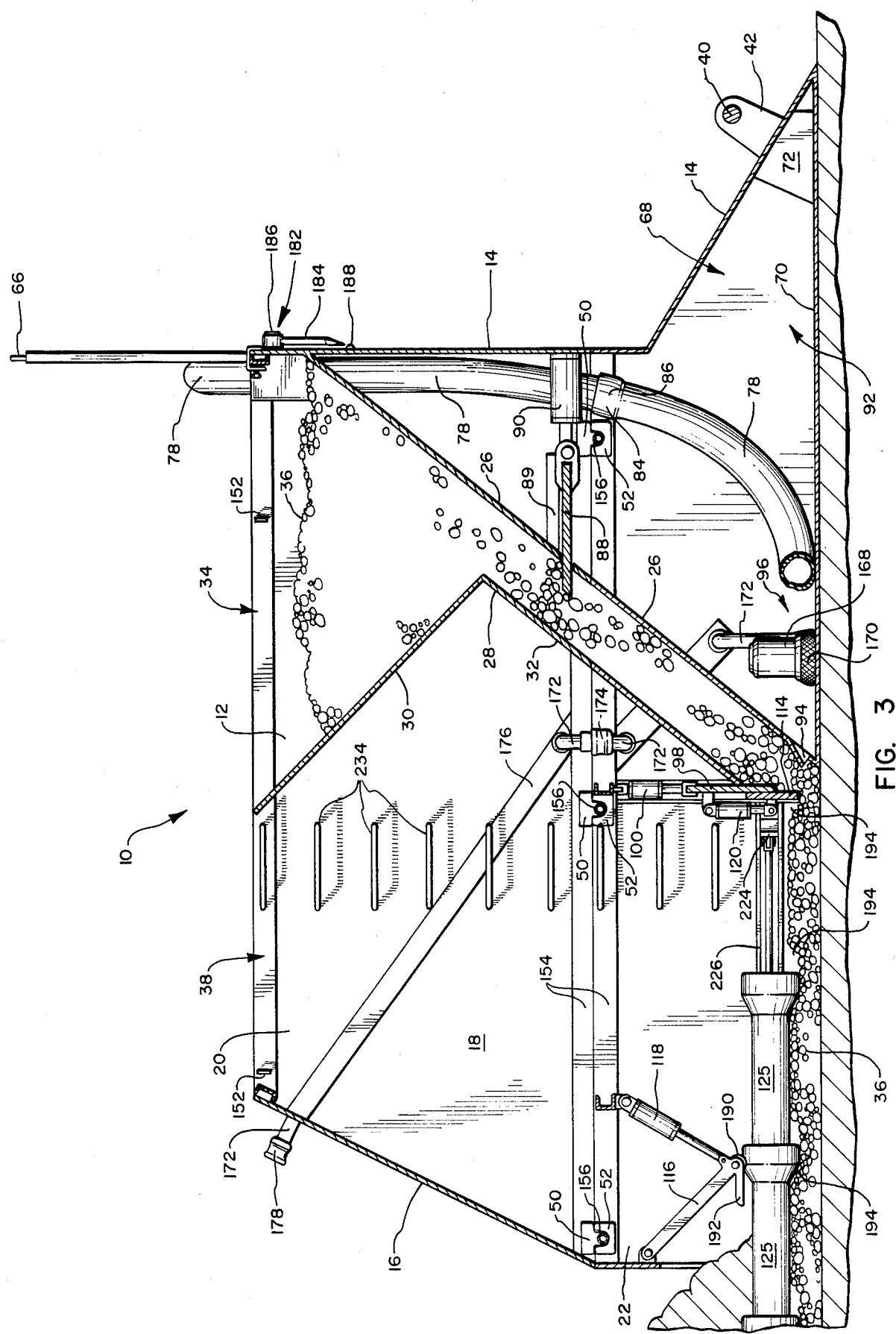
FIG. 3 is an elevational, longitudinal section view of the apparatus showing the relative disposition of various features within the apparatus.

As shown particularly in FIGS. 2 and 3, the boxlike structure 12 further comprises internal transverse walls which define compartments within the boxlike structure 12. The boxlike structure 12 has a fill bin compartment 34 internal of the boxlike structure 12 for receiving fill material 36 and dispensing the fill material 36 on the bottom of a trench and a conduit laying compartment 38 which is the area in which conduit is fed for alignment and positioning at the bottom of a trench. In one of the preferred embodiments of the present invention, as illustrated in FIG. 2, the fill bin compartment 34 is defined by an interior fill material slide wall 26 and an interior fill material bin wall 28. The interior fill material bin wall has a hopper portion 30 and a chute portion 32. In another preferred embodiment of the present invention illustrated at FIG. 12, the boxlike structure 12 has only one interior transverse wall, the interior fill material side wall 26 and the rear end wall 16 serves as the hopper portion and chute portion for a fill material bin wall.

Figure 1:
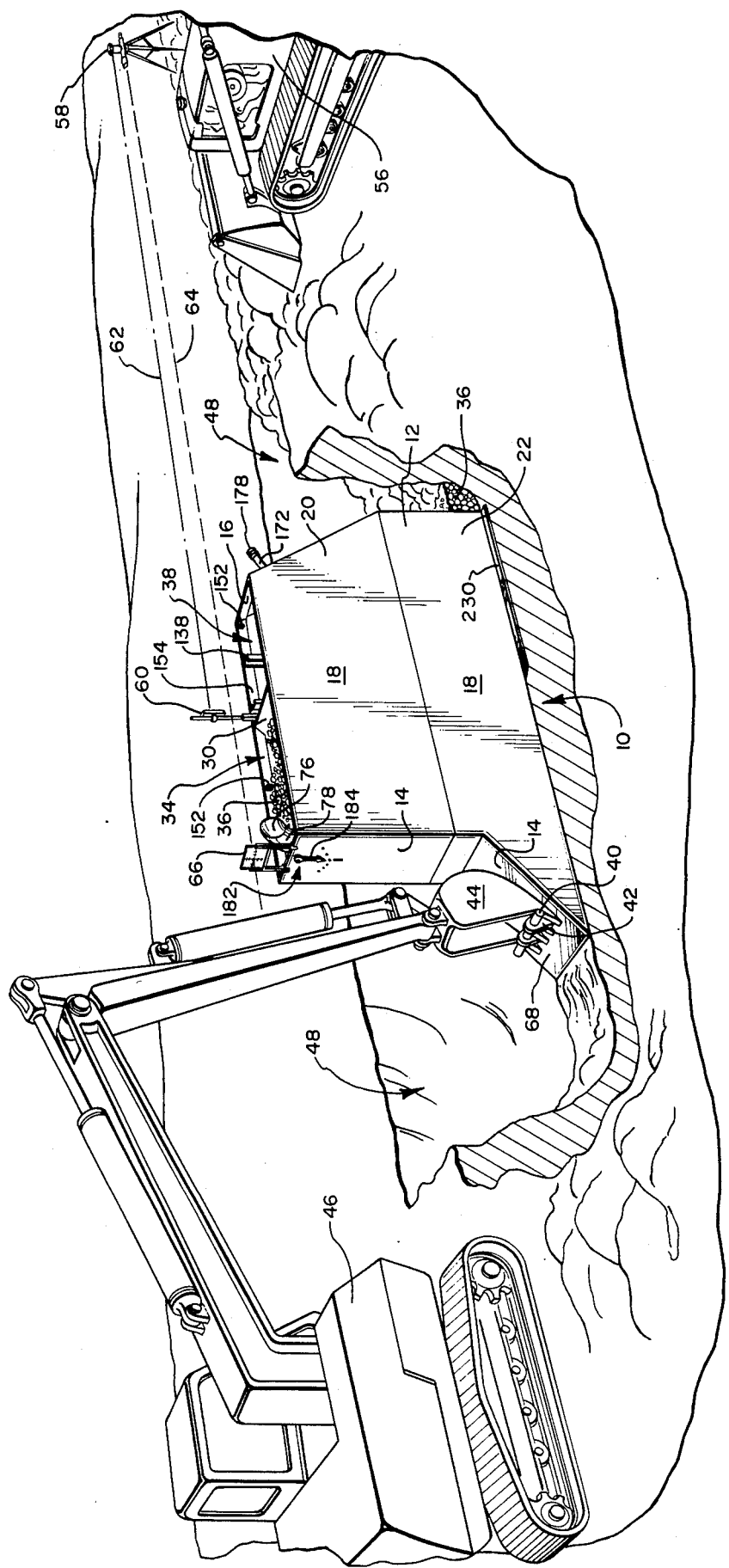
FIG. 1 is a perspective view of the apparatus of the present invention wherein a portion of the trench wall is cut away to show the apparatus, a backhoe bucket engaging the tow bar portion of the apparatus, a front end loader back filling the trench, and the disposition of a portion of the grade and alignment maintenance system.

The boxlike structure 12 further comprises a tow bar 40 mounted on the forward end wall 14. The two bar 40 is disposed in brackets 42 which are rigidly mounted on the forward end wall 14 of the lower portion 22 of the boxlike structure 12. The tow bar 40 is spaced from the forward end wall 14 sufficiently to receive the teeth of a bucket 44 of an excavating implement 46 substantially as shown in FIG. 1. When the bucket 44 of an excavating implement 46 (e.g. a backhoe) grasps the tow bar 40 in the manner illustrated in FIG. 1, the operator of the excavating implement 46 can apply downward force against the end wall 14 while simultaneously pulling on the tow bar 40 to advance the boxlike structure 12 within the trench, thereby lowering the boxlike structure 12 within a trench 48. Lifting force may be applied to lift the boxlike structure 12 within the trench 48 by curling the bucket 44 in about the tow bar 40 and pulling up on the tow bar 40 while pulling force is applied against the tow bar 40 to advance the boxlike structure 12 within the trench 48. It has been found that the tow bar configuration illustrated and described herein enables the operator of the excavating implement 46 to maneuver the apparatus for laying conduit 10 within the trench 48 with remarkable on-grade precision because he can apply vertical, longitudinal and lateral forces as needed to maintain grade. Thus, the task of maintaining the boxlike structure 12 positioned so that conduit can be laid on grade and in alignment is appreciably assisted by the tow bar configuration.

The boxlike structure 12 further comprises features for securing the upper portion 20 to the lower portion 22 in an aligned and flush engagement. The features also permit the releasable attachment of the upper portion 20 to the lower portion 22. These features include engagement members 50, receiving members 52, and latches 54 which will be described with more particularity hereinbelow.

Turning now particularly to FIG. 1, the apparatus for laying conduit within a trench 48 is illustrated within the trench 48. An excavating implement 46 such as a backhoe clears the earth away from the forward end of the boxlike structure 12. The excavating implement can then grasp the tow bar 40 and pull the boxlike structure 12 forward within the trench 48. When fill material 36 is disposed within the fill bin compartment 34, as the boxlike structure 12 is advanced forward, a layer of fill material 36 is deposited on the floor of the trench 48. Conduit (not shown) is lowered into the conduit laying compartment 38 for positioning on the layer of fill material 36 in alignment and on grade. The lowering and positioning of the conduit within the trench can be done manually or with the assistance of conduit-lowering mechanism, while the escavating implement continues to escavate the trench 48 forward of the boxlike structure 12. Obviously, if a worker is positioned within the conduit laying compartment 38, the side walls 18 of the boxlike structure 12 protect the worker against the collapse of the trench walls.

As the boxlike structure 12 is advanced within the trench 48, it is preferred that a small loader 56 fill the fill bin compartment 34 with fill material 36 as needed. Thus, the excavating implement 46 is free to excavate trench 48 and advance the boxlike structure 12. There is no particular need to provide additional heavy equipment. The same small loader 56 can promptly back fill the trench 48, as shown in FIG. 1.

It has been determined that with most ground conditions, the apparatus 10 of the present invention enables the underground contractor to move less than half the material that is normally required during trenching operations. Thus, there is correspondingly less than half the material to be back filled into the trench 48 once the conduit has been set. Because material movement has been minimized, the trenching operation advances more rapidly. Also, since the excavating implement 46 does not lay idle while conduit is being set within the trench 48, but it is used to excavate the trench 48 in advance of the boxlike structure 12, the excavating implement 46 is being used continuously and much more efficiently. These efficiencies significantly increase the amount of conduit that can be laid in a trench 48 per day. On any project for laying subterranean conduit, this can mean drastic savings in equipment rental costs and labor costs.

In order to insure that the conduit is laid in alignment and on grade, a preferred embodiment of the present invention also comprises a grade maintenance assembly. The grade maintenance assembly comprises a laser transmitter 58 which transmits signals to a laser receiver 60 which determines the depth of the trench 48 at the point where conduit is being laid. In a preferred embodiment, the laser transmitter 58 transmits at least two types of signals, a sweeping signal 62 which is received by the laser receiver 60 and an alignment signal or beam 64 which strikes a target 66 mounted on the boxlike structure 12. The manner in which the grade and alignment maintenance assembly operates is described with more particularity below.

In FIG. 2 a preferred embodiment of the present invention is shown in which the relative disposition of the internal components are illustrated. In this preferred embodiment, the boxlike structure 12 has an angled nose portion 68 and a floor 70. The angled nose portion 68 inclines downwardly to a cutting edge at the bottom of the boxlike structure 2. The angled nose portion 68 and floor 70 assist in shearing on-grade the bottom of the trench 48 to maintain the boxlike structure 12 on grade. Since the bucket 44 of the excavating implement 46 is used to apply force on the forward end wall 14, it is preferred that gussets 72 be provided so that the structural integrity of the angled nose portion 68 is maintained.

A preferred embodiment, as illustrated in FIG. 2, further comprises a flexible conduit feed assembly 74 having an inlet 76, a feed tunnel 78 and a plate 80 with a discharge sleeve 82. The feed tunnel 78 may be separated at junction 84 (as shown in FIG. 3) to accommodate the separation of the boxlike structure 12. The lower portion of the feed tunnel 78 has a flared end 86 which receives the upper portion of the tunnel 78 so that when flexible conduit is fed through the feed tunnel 78 it will not snag or hang up within the feed tunnel 78.

Also illustrated in the preferred embodiment shown in FIG. 2 is a fill material shut-off gate 88 which is operated by a ram 90. As shown at FIG. 6, the fill material shut-off gate 88 rests on channel braces 154 and beneath angle braces 89. The ram 90 operates to move the fill material shut-off gate 88 in a longitudinal reciprocating motion between open and closed positions. When the fill material shut-off gate 88 is open, it permits fill material 36 stored within the fill bin compartment 34 to slide down the interior fill material slide wall 26 to the bottom of the trench 48. When the upper portion 20 of the boxlike structure 12 is separated from the lower portion 22, it becomes necessary to close off the upper portion of the fill bin compartment 34 so that fill material 36 is not spilled into the working area. To accomplish this, the ram 90 pushes the fill material shut-off gate 88 forward to its closed position.

The forward end wall 14, the floor 70, the side walls 18 and the interior fill material slide wall 26 define an enclosed compartment 92 for the preferred embodiment illustrated in FIG. 2. The enclosed compartment 92 houses a dewatering system for the apparatus for laying conduit 10. The dewatering system comprises a plurality of vent openings 94 and a water collection and discharge assembly 96 which collects ground water which accumulates through seepage within the enclosed compartment 92 and removes it from the boxlike structure 12 for discharge remote from the trench 48.

To strike off the fill material 36 as it is dispensed from the fill bin compartment 34, a leveler gate 98 is provided. The leveler gate 98 is operated in its vertical movement by a ram 100 and laser receiver mast 102 which communicates with the laser receiver 60. In the preferred embodiment illustrated, the laser receiver mast 102 comprises a push rod 104 which engages a shoulder 106 connected to the upper mast rod 108. The upper mast rod 108 is held in position adjacent to the side wall 18 by guide mounts 110 and a nub 112 prevents the upper mast rod 108 from falling through the guide mounts 110 when the upper portion 20 of the boxlike structure 12 is detached and lifted from engagement with the lower portion 22.

Attached to the leveler gate 98 can be a notching gate 114 which is used to carve a notch 194 in the layer of fill material 36 to accommodate the bell of a conduit. The notching gate 114 is actuated by an assembly comprising a roller arm 116 connected to a sensing ram 118 which communicates to a responsive ram 120 which is mounted between the notching gate 114 and leveler gate 98. The roller arm 116 is designed to travel the contour of the upper surface of a conduit 125 (as shown in FIG. 3) so that any changes in the contour are communicated to the sensing ram 118 which conveys that change in contour via tube 122 to the responsive ram 120. The responsive ram 120, then in response to the signal from the sensing ram 118 actuates the vertical movement, either up or down, of the notching gate 114. As shown in FIG. 2, the leveler gate 98 and notching gate 114 are disposed within guide channels 124 which permit the vertical sliding movement of the leveler gate 98 and notching gate 114.

In order to lower conduit 125 into the boxlike structure 12 of the preferred embodiment illustrated in FIG. 2, a conduit lowering assembly 126 is provided. The conduit lowering assembly 126 comprises a grasping mechanism 128 and a conveyance mechanism 130. The grasping mechanism 128 is used to grasp and hold securely a conduit 125 for safe lowering into the trench 48. The grasping mechanism 128 comprises a guide tube 132, a sliding member 134 and an eyelet 136 used to suspend the grasping mechanism 128 during raising and lowering of the conduit 125 onto support arms 142 of the conveyance mechanism 130. The conveyance mechanism 130 comprises a pair of rails 138 secured to the inside of one of the side walls 18 of the boxlike structure 12 and a lowering member 140 comprising support arms 142, a support plate 144, and rollers 146 which permit movement of the lowering member 140 vertically within the conduit laying compartment 38.

A primary feature of the preferred embodiment of the apparatus 10 of the present invention is its separability into an upper portion 20 and a lower portion 22. This separability introduces tremendous versatility to the apparatus 10. The separation of the boxlike structure 12 facilitates transport of the apparatus 10 because the upper portion 20 and lower portion 22 can be laid on their sides and stack one on top of the other on a flat bed trailer that can be easily towed by a pick-up truck. This enables transport without any height problems with overpasses or underpasses and also facilitates the storage of the apparatus 10 because it can be placed on a trailer and transported to a storage facility.

The assembly and disassembly of the apparatus 10 can be accomplished rapidly and without any complexity. When assembling the apparatus 10, the upper portion is always assured of properly square alignment because the engagement members 50 are configured to register with the receiving members 52 for nesting engagement. As illustrated in FIG. 4, the upper portion 20 of the boxlike structure 12 can be lifted from or lowered onto the lower portion 22 using cables 148 connected to the bucket 44 of the excavating implement 46. Cables 148 are draped over a hook 150 on the bucket 44 and secured to the upper portion 22 at lifting ears 152. When suspended as shown in FIG. 4, a worker can easily maneuver the suspended upper portion 20 laterally or longitudinally so that the engagement members 50 align in register with the receiving members 52.

As best shown in FIG. 5, the upper and lower portions 20 and 22 have channel braces 154 attached at the edges of the upper and lower portions 20 and 22. Mounted on the channel brace 154 for the upper portion 20 are the engagement members 50 which comprise a transverse rod 156 mounted between brackets with a U-shaped portion 158 which extend below the lower edge of the upper portion 20 of the boxlike structure 12. Mounted on the channel brace 154 of the lower portion 22 of the boxlike structure 12 are the receiving members 52 which comprise a U-shaped cup 160. When the upper portion 20 is properly aligned, the U-shaped portion of the brackets 158 nest in the U-shaped cups 160 as shown in FIG. 2. Latches 54 can then be secured to prevent the upper portion 20 from movement with respect to the lower portion 22. The latches 54, as best shown in FIG. 5, are preferably a lever and catch assembly having a lever 162, a catch 164 and an adjustable connector 166 which engages the catch 164 in securing engagement. Although the preferred embodiment is a lever and catch assembly, it should be understood that other types of locking or securing means may be used.

When lifting the upper portion 20 from the lower portion 22, the latch 54 is disengaged, cables 148 are draped over the hook 150 attached to the excavating implement bucket 44 and secured to lifting ears 152. If there is some material 36 in the fill bin compartment 34, the fill material shut-off gate 88 is closed so that no fill material 36 will spill from the compartment 34. Then, the bucket 44 lifts the cables 148 attached to the upper portion 20, thereby lifting the upper portion 20 from the lower portion 22.

This feature is particularly useful during the conduit laying operation when an obstacle such as a utility line is encountered. In such instances, the boxlike structure 12 is pulled near the utility line and the upper portion 20 of the boxlike structure 12 is removed and lifted out of the trench 48, thereby permitting clearance of the lower portion 22 beneath the utility line. The laying of conduit 125 can recommence using only the lower portion 22 of the boxlike structure 12. Of course, some of the features are not available when using only the lower portion 22. However, the use of the lower portion 22 significantly aids the laying of conduit 125 beneath the utility line. A considerable amount of time savings is afforded by using this procedure because with the lower portion 22 remaining in the trench 48, the amount of earth required to be removed in sloping back the trench walls is significantly reduced and use of the lower portion 22 still enables the operator to lay a uniform layer of fill material 36 on the bottom of the trench 48.

Once the lower portion 22 of the boxlike structure 12 clears the utility line, the upper portion 20 can be lowered back into the trench 48, aligned, squarely seated, and secured in nesting engagement with the lower portion 22 so that normal conduit laying can recommence. It should be understood that where the boxlike structure 12 is equipped with multiple separations (see, for example, FIG. 12), the boxlike structure 12 can be separated at any of these separations to avoid an obstacle.

During use of the apparatus 10 of the present invention, ground water may seep into the trench 48 from the water table. Ground water seepage problems are particularly prevalent when a trench boot, such as the apparatus 10 of the present invention is parked within the trench 48 for any substantial period of time, such as overnight. If a sufficient amount of ground water seeps into the area of the conduit laying compartment 34, it can cause significant problems with the conduit laying operation. With the preferred embodiment, ground water seeping into the boxlike structure 12 is permitted to pass through the interior fill material slide wall 26 at vent openings 94. See FIG. 8. Ground water passing through such vent openings 94 accumulates within the enclosed compartment 92. The ground water accumulating in the enclosed compartment 92 can be collected and withdrawn from the boxlike structure 12 by using the water collection and discharge assembly 96. As shown in FIGS. 2 and 3, the water collection and discharge assembly 96 comprises a pump 168 with a suction screen 170 which collects the ground water and discharges it through an exhaust tube 172 which exits at the rear of the boxlike structure 12 to facilitate discharge of the ground water remote from the trench 48. It is preferred that the exhaust tube 172 has a separable coupling 174 whereby the exhaust tube 172 can be separated when the upper portion 20 of the boxlike structure 12 is lifted from the lower portion 22. It is also preferred that the exhaust tube 172 be enclosed in or integral with a channel support member 176 which runs along a side wall 18 of the boxlike structure 12 to the point of exit through the rear wall 16. This channel support member 176 provides added stabilizing support to the side wall 18. A coupling 178 is provided near the rear wall 16 so that a hose or tube can be connected to the exhaust tube 172 which will direct the ground water being discharged to a point remote from the trench 48. Although the water collection and discharge assembly 96 described herein and shown in FIGS. 2 and 3 comprises a pump 168 disposed within the enclosed compartment 92, it should be understood that other water collection and discharge assemblies may be used. For example, the pump 168 may be disposed at a point outside the trench 48 and connected to the enclosed compartment 92 via a suction tube and a suction screen 170.

When laying conduit in a particularly high water table, in which water seepage becomes a significant problem, the water collection and discharge assembly 96 may be operated continually during use of the apparatus 10 so as to extract as much ground water as possible.

Although no dewatering system is illustrated with regard to the embodiment illustrated in FIG. 12, it should be understood that a dewatering system similar to that shown in FIGS. 2 and 3 could be adapted for use with other embodiments of the invention.

When possible, and as needed, it would be tremendous time and cost savings to lay flexible conduit and rigid conduit simultaneously. When done, a single trench 48 would be excavated. Earth within the trench would be removed and back filled but once, and subsequent location of the conduits, if necessary for repair or replacement, could be easily accomplished. A preferred embodiment of the apparatus 10 of the present invention has a flexible conduit feed assembly 74 which provides a feed tunnel 78 through which flexible conduit 180 can be directed. As the boxlike structure 12 of the present invention is advanced within the trench 48, flexible conduit 180 can be continuously fed through the inlet 76 into the feed tunnel 78. The flexible conduit 180 exits the feed tunnel 78 at the discharge sleeve 82. In this manner, when fill material 36 is being deposited in a layer on the bottom of the trench 48, the flexible conduit 180 is enveloped in the layer of fill material 36. The discharge sleeve 82 is centrally disposed sufficiently above the floor 70 of the boxlike structure 12 such that fill material 36 is deposited beneath any flexible conduit 180 being fed into the fill material 36 envelope. See FIG. 8. As flexible conduit 180 is laid within the envelope of fill material 36, rigid conduit 125 can be simultaneously laid on the surface of the fill material 36 layer.

If a project does not require the simultaneous laying of flexible conduit 180 and rigid conduit 125, the plate 80 having the discharge sleeve 82 may be removed and replaced with a flat plate 80. In this manner, fill material 36 is free to slide over the flat plate 80 to the bottom of the trench 48.

In the preferred embodiments of the present invention, a number of features are provided which assist the operator of the apparatus 10 in maintaining the apparatus 10 in alignment and on grade. As mentioned above, certainly the angled nose portion 68 in conjunction with the floor 70 assist in shearing the bottom of the trench 48 and holding the boxlike structure 12 on grade. These features also make it unnecessary to over-excavate the trench 48. Another feature is the tilt indicator 182 which provides a visual indication whether the boxlike structure 12 is being maintained on vertical. The tilt indicator 182 comprises a pendulum pointer 184 mounted on the forward end wall 14 of the boxlike structure 12 on a pivot pin 186 which permits the pendulum pointer 184 to freely rotate about the pin 186. Markings 188 are provided to assist the operator in determining visually whether the boxlike structure 12 is being maintained in a vertically upright position.

Another feature which assists in maintaining the apparatus 10 on grade and in alignment is the laser transmitter/receiver assembly briefly mentioned above. That assembly comprises the laser transmitter 58, the laser receiver 60, the target 66, the leveler gate 98 and the laser receiver mast 102. With the laser transmitter/receiver assembly, the depth of the trench 48 may be maintained at a uniform depth by maneuvering the apparatus 10 within the trench by applying lifting or downward forces as needed on the tow bar 40. In the preferred embodiment, the laser transmitter 58 is disposed in a position where it will remain undisturbed by the excavation and conduit laying activity. The disposition of the laser transmitter 58 can be either external of or within the trench 48, depending on the depth of the trench 48 and the height of the boxlike structure 12. It is important, however, that the signals from the laser transmitter 58 be unobstructed. The laser transmitter 58 provides a sweep signal 62 on a horizontal plane and an alignment beam 64 on a direct line parallel to the alignment desired for the conduit 125 being laid. The laser receiver 60 receives the sweep signal 62 and can determine via its sensing capability whether the bottom of the trench 48 is being maintained on grade, above grade or below grade. The laser receiver 60 has photo cells which sense the sweep signal 62 and in turn actuate a hydraulic valve (not shown) which is in communication with and actuates ram 100 such that when the sweep signal 62 received indicates that the boxlike structure 12 is below grade, the ram 100 lifts the leveler gate 98 to compensate for the amount that the boxlike structure 12 is below grade. If the boxlike structure 12 is above grade, the laser receiver 60 communicates with ram 100 such that ram 100 extends leveler gate 98 to compensate for the amount the boxlike structure 12 is off grade. As the leveler gate 98 is raised or lowered by ram 100, the push rod 104 attached to leveler gate 98 is raised or lowered accordingly. The push rod 104 abuts shoulder 106 which is attached to the upper mast rod 108. Movement of push rod 104 is transmitted through shoulder 106 to the upper mast rod 108 such that it slides up and down within guide mounts 110. Thus, the laser receiver 60 attached to the uppermost end of the upper mast rod 108 is raised or lowered the same amount as the leveler gate 98. In this manner, the laser receiver 60 is adjusted upward and downward corresponding to the upward and downward movement of the leveler gate 98 whereby a uniform trench depth is maintained despite slight variations caused when moving the boxlike structure 12 within the trench 48.

Not only does operation of the grade maintenance features provide accurate on-grade laying of conduit, they also reduce tremendously the amount of fill material 36 that is wasted. Where no angled nose 68 is used to shear off the bottom of a trench 48 nor laser transmitter/receiver assemblies used to maintain uniform trench depth, the trenches 48 are frequently overexcavated to assure that there is a minimum amount of fill material 36 base beneath the conduit 125. It is not unusual for the fill material 36 layer to be a couple of feet thick in some places to assure that a minimum half foot layer of fill material 36 is placed beneath the conduit 125. Such wasting of fill material 36, is time consuming and expensive.

Maintenance of the boxlike structure 12 in alignment while pulling it through the trench 48 is assisted by a visual display on target 66. The laser transmitter 58 provides an alignment beam 64 which is set parallel to the alignment desired for the conduit. As the alignment beam 64 strikes target 66, a visual display of the beam on the target 66 enables the operator to adjust for alignment and grade according to the degree of displacement of the alignment beam 64 from the center of the target 66.

Another feature which facilitates maintaining the conduit 25 in alignment along the surface of the fill material 36 is the notching assembly which carves a notch 194 in the surface of the fill material 36 to accommodate the bell for a conduit 125. As mentioned above, the notching assembly comprises a notching gate 114, a roller arm 116, and a sensing ram 118 connected to a responsive ram 120 by a tube 122 (see FIG. 2). In practice, the roller arm 116, having a roller 190 and a delay extension 192, engages the upper surface contour of a previously laid conduit 125, as shown in FIG. 3. As the roller 190 engages the bell of the conduit, the roller arm 116 forces sensing ram 118 to contract, and that contraction signals the responsive ram 120 to actuate the extension of notching gate 114. When extended as shown, the notching gate carves a notch 194 in the surface of the fill material 36. As the roller 190 travels over the bell, delay extension 192 continues to engage the bell such that an oversized notch 194 is carved in the fill material 36 so as to accommodate the longitudinal movement of a conduit 125 when the conduit 125 is being aligned and set with the next previously set conduit 125. By providing notches as shown in FIG. 3, each conduit is maintained as close to level and on grade as possible.

The conduit lowering assembly 126 of the present invention not only assists in lowering of conduit 125 into the conduit laying compartment 38 but also assists in maintaining the conduit 125 in alignment as it is positioned and set for its final disposition on the surface of the fill material 36 layer. The conduit-lowering assembly 126 comprises a grasping mechanism 128 and a conveyance mechanism 130. The grasping mechanism 128 comprises a guide tube 132 within which a sliding member 134 is provided. The grasping mechanism further comprises at least one clamp 196 disposed to clamp onto the barrel portion of a conduit 125. The clamp 196 is attached to the guide tube 132, and it is preferred that clamp 196 have interchangeable jaws 198 to accommodate various sizes of conduit 125. The jaws 198 can be changed by disengaging bolts 200 and replacing one size of jaws 198 with another size and resecuring bolts 200 (see FIGS. 10 and 11). It is preferred that the clamp 196 be releasable and spring loaded such that as the jaws 198 of the clamp are closed about a conduit 125 a spring holds the clamp jaws 198 snugly against the conduit 125. To release the jaws 198 from grasping engagement of a conduit 125, means for triggering the release is required. To accomplish this grasping/release function, the spring-loaded clamp utilizes an off-center clamping mechanism wherein the jaws 198 of the clamp 196 are held in a grasping position by a spring (not shown) when a clamp roller 202 is disposed in its lowermost position. To achieve this position, a handle 204 is provided whereby a user can manually lock the clamp jaws 198 into grasping engagement by swinging the handle 204 to its substantially horizontal locking position. To release the clamp 196 the clamp roller 202 is engaged and lifted or the handle 204 can be manually lifted to release the grasping engagement of jaws 198 to the conduit 125.

The sliding member has disposed at one end a hooking finger 206 which engages and supports the bell end of the conduit 125. The sliding member 134 has at its other end a centering guide 208 comprising curved arms 210 with rolling cylinders 212 which engage the bell portion of the previously laid conduit 125, a bell stop 214 and trigger 216.

Figure 10:
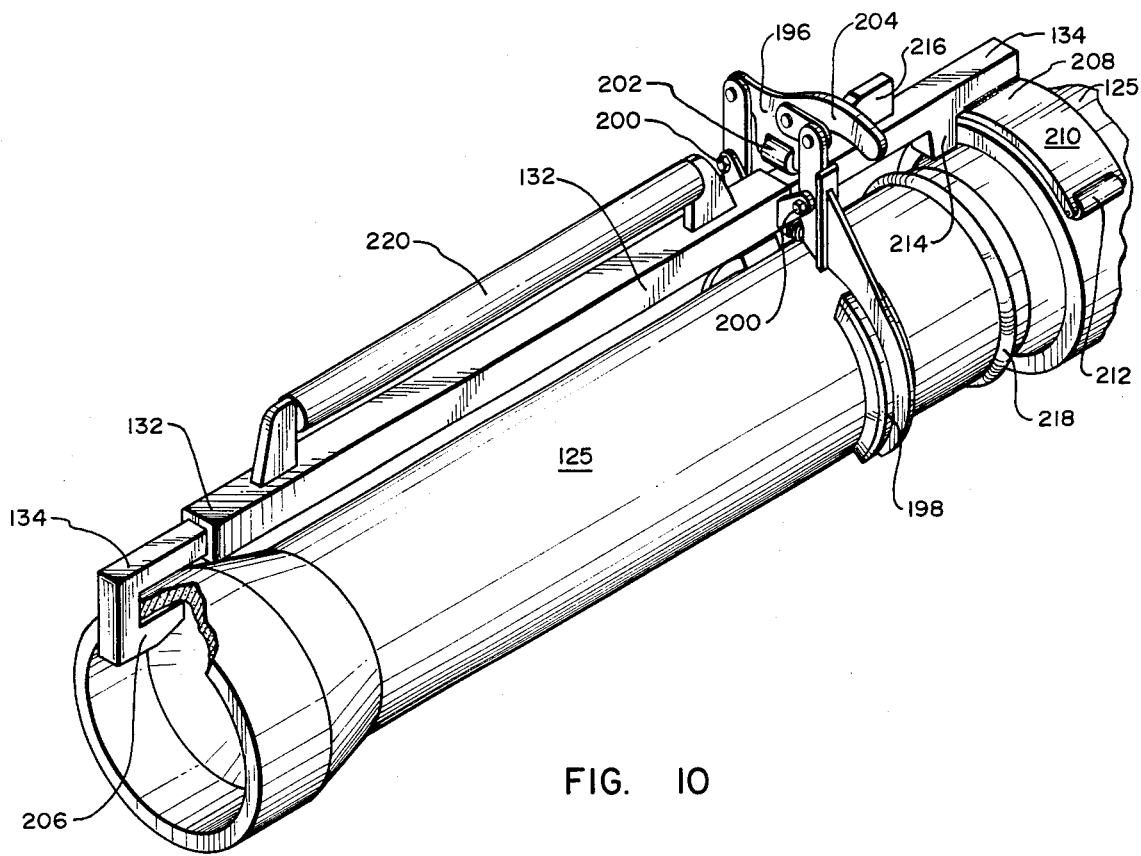
FIG. 10 is an enlarged perspective view of the grasping mechanism used in the conduit-lowering assembly showing a conduit in grasping engagement.
Figure 11:
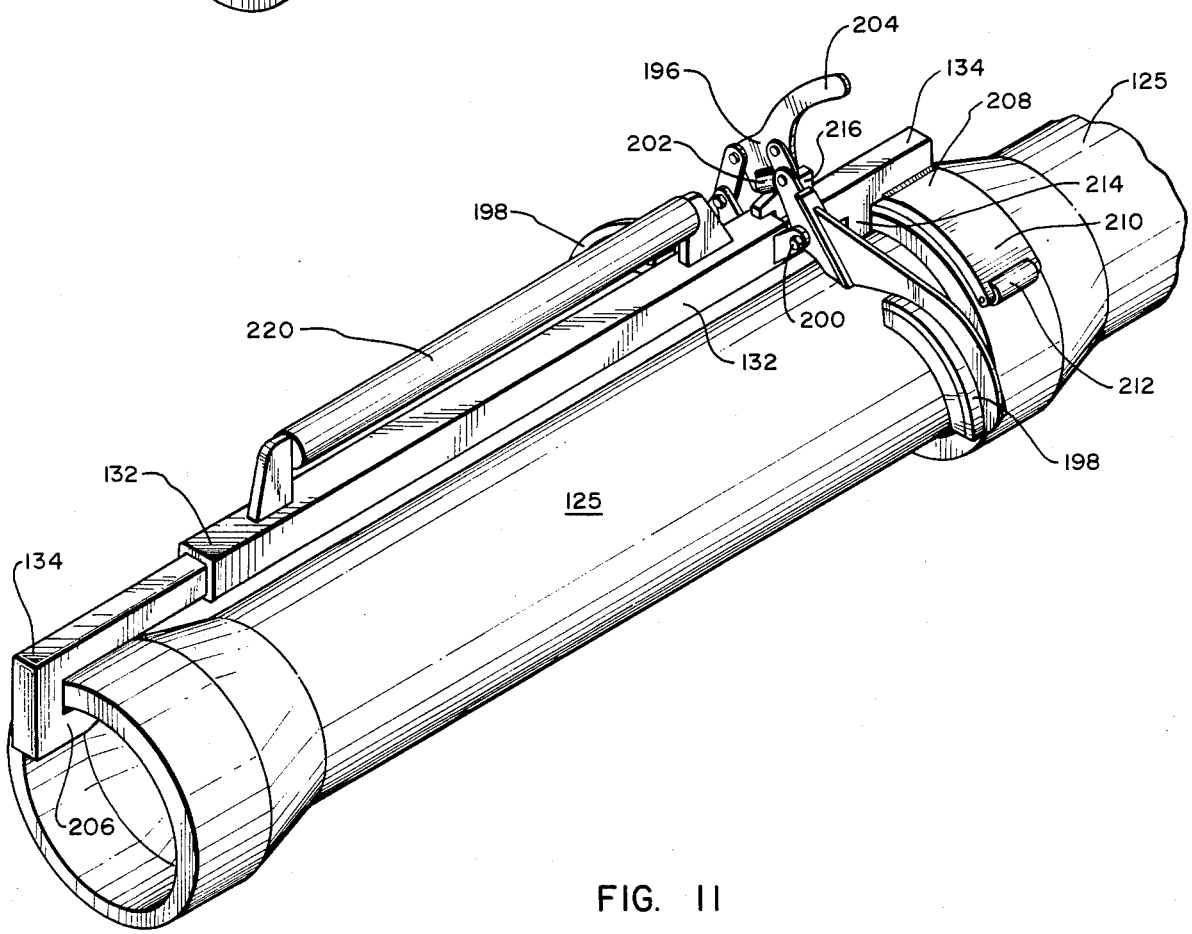
FIG. 11 is an enlarged perspective view of the grasping mechanism used in the conduit-lowering assembly showing the clamp of the grasping means being released.

The sliding member 134 is free to move longitudinally within guide tube 132 until a conduit 125 is grasped within the grasping mechanism 128. FIG. 10 illustrates a conduit 125 just before engagement with a previously laid conduit 125. In FIG. 10, the hooking finger 206 is shown supporting the bell portion of the conduit 125 and the clamp 196 grasping the barrel portion of the conduit 125. As the conduit 125 is advanced toward its setting engagement with a previously laid conduit 125, the sliding member 134 slides within guide tube 132 such that the trigger 216 engages the clamp roller 202 in lifting engagement as shown in FIG. 11. The trigger 216 engages the guide tube 132 thereby preventing any further sliding movement of sliding member 134 within the guide tube 132. When this happens, further advancement of the conduit 125 will release the hooking finger 206 from its supporting engagement of the bell portion of the conduit 125. In this manner, the grasping mechanism 128 is completely released from the conduit 125 as that conduit 125 is set and sealed within the next previously laid conduit 125. To assure a tight and leakproof seal, a gasket 218 is disposed at the connection end of the conduit 125.

Once released, the grasping mechanism 128 may be secured in grasping engagement to another conduit 125 in the same manner as previously described.

When the grasping mechanism 128 secures a conduit 125 in grasping engagement, this conduit 125 may be lowered manually into the conduit-laying compartment 138, or as is preferred, a conveyance mechanism 130 may be used to assist in lowering and aligning the conduit 125. The conveyance mechanism 130 comprises a pair of rails 138 and a lowering member 40, which comprises support arms 142, a support plate 144, and rollers 146. The lowering member 140 moves vertically as guided by the rails 138. To lower a conduit 125 into the conduit laying compartment 38, the grasping mechanism 128 is positioned to be suspended via a suspension bar 220 which is mounted on the guide tube 132. The suspension bar 220 engages centering notches 222 in the support arms 142 such that the conduit 125 is suspended centrally within the boxlike structure 12 and in alignment with the desired alignment for the laying of conduit. The lowering member 140 may be gradually lowered into the conduit laying compartment 38 via any conventional manner such as manually lowering the member on a rope or cable, or by use of counterweights, or by a powered chain and sprocket drive, or by using a hydraulic ram which would raise or lower the lowering member 140 in response to hydraulic signals controlled manually.

Figure 9:
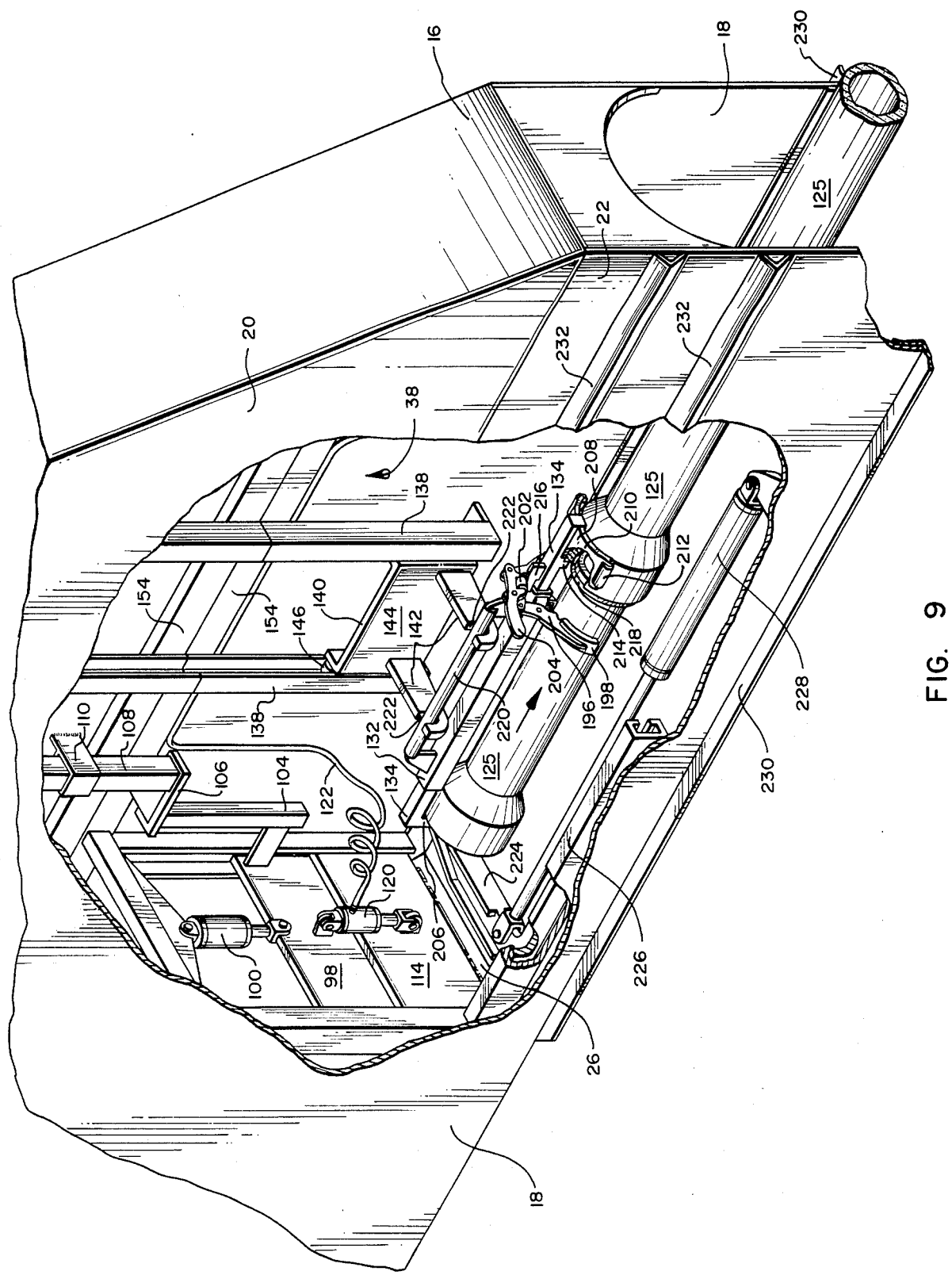
FIG. 9 is an enlarged perspective cut-away view of the apparatus viewed from the rear in which a side wall is partially cut away to show the conduit lowering assembly lowering a section of conduit for alignment and setting.

Thus, to lower a conduit 125 into the conduit laying compartment 38, the grasping mechanism 128 is secured to a conduit 125 in the manner shown in FIG. 10. The grasping mechanism 128 is then suspended on the support arms 142 of the lowering member 140 as shown in FIG. 2. The lowering member 140 is then guided downward by rails 138 to where the conduit 125 reaches the surface of the fill material 36 or the bottom of the trench 48, as shown in FIG. 9. The grasping mechanism 128 is then released from the conduit as the conduit 125 is advanced into setting engagement with the next previously laid conduit 125 as shown in FIGS. 9 and 11. Once released, the grasping mechanism 128 can be lifted from the conduit laying compartment 38 for engagement with another conduit 125 so that the procedure can be repeated.

To advance the conduit 125 into setting engagement with the next previously laid conduit 125, a conduit setter assembly is provided. Such conduit setter assembly comprises a push arm 224 with a guide support 226 and a ram 228. The conduit setter assembly operates on a conduit 125 which has been lowered into the conduit laying compartment 38 but has not been set into the next previously laid conduit. The push arm 224 engages the bell portion of the conduit 125. As ram 228 contracts, the push arm 224 slides within the guide support 226 which is mounted on a side wall 18 so that the push arm 224 applies a horizontal pushing force in the direction as shown by the arrow in FIG. 9. When a grasping mechanism 128 is used to assist in grasping and lowering the conduit 125 into the conduit laying compartment 38, the push arm 224 advances the conduit 125 such that the trigger 216 engages the clamp roller 202 and releases the clamp 196 and the hooking finger 206.

Additional features which are provided for the boxlike structure 12 include stiffeners such as the base stiffeners 230 and the side stiffeners 232 which provide support and rigidity to the side walls 18 of the boxlike structure 12. Also, to facilitate access to the conduit laying compartment 38, a set of step rungs 234 are provided whereby a worker may descend into the conduit laying compartment 38.

Another preferred embodiment of the present invention is illustrated in FIG. 12. This embodiment is particularly adapted for laying substantially rigid plastic pipe within a layer of fill material 36. With this preferred embodiment, the plastic conduit 236 is lowered into the conduit laying compartment 38 which is disposed forward of the fill bin compartment 34. The plastic conduit 236 is positioned for its disposition within a layer of fill material 36 by a rocking arm assembly 238. The rocking arm assembly 238 comprises a pivot pin 240 disposed in pivoting engagement with a pivot bar 242 having a plurality of pivot holes 244. By positioning the pivot pin within any one of the pivot holes 244, the depth of fill material 36 to be disposed beneath the plastic conduit 236 can be adjusted. By way of illustration, if the pivot pin 240 is raised, this would cause more fill material 36 to flow beneath the plastic conduit 236 for support. On the other hand, if the pivot pin is lowered, less fill material 36 would support the plastic conduit 236.

The rocking arm assembly 238 further comprises a rocking arm 246 which pivots on the pivot pin 240. The rocking arm 246 has a trough portion 248 which assists in holding the plastic conduit 236 in alignment. At the distal end of the rocking arm 246 is a roller box 250 having rollers 252 and a housing 254. Attached to the housing 254 can be a thimble 256 through which the plastic conduit 236 is discharged into the fill bin compartment 34 where the plastic conduit 236 is enveloped in a layer of fill material 36.

The plastic conduit 236 is lowered into the boxlike structure 12 substantially as shown in FIG. 12 and is directed to its resting position on the rocking arm 246 by a slide 258. As the plastic conduit 236 drops into position, the bell of the plastic conduit 236 engages touch plate 260 which releases the ram plate 262 which is operated by a ram 264 to advance the plastic conduit 236 into a setting engagement with the next previously laid conduit 236.

As the boxlike structure 12 of this preferred embodiment is advanced within the trench 48 in a manner similar to that described herein with regard to other preferred embodiments, the plastic conduit 236 advances along the rocking arm 246 until another section of plastic conduit 236 can be introduced into the line.

To assure that the plastic conduit 236 is laid in alignment and on grade, a grade maintenance assembly similar to that described above can be used. In the preferred embodiment illustrated in FIG. 12, a laser receiver 60 is provided and is disposed such that the laser receiver mast 102 is encased in a fin 266. Although a fin 266 is shown as a preferred embodiment it should be understood that other configurations for the laser receiver mast and the protection thereof can be used. The laser receiver 60 is in communication with adjustment ram 268 which raises or lowers the roller box 250 in response to the signal received by the laser receiver 60. As the roller box 250 is raised or lowered to compensate for deviations from grade, the laser receiver mast 102 is also raised or lowered accordingly.

Fill material 36 can be placed in the fill bin compartment 34 for disposition at the bottom of the trench. A manually adjustable leveler 268 is provided on the rearmost end of the boxlike structure 12 to strike off the fill material 36. Also, a pair of baffles 270 which angle inwardly from the side walls 18 are provided in order to windrow fill material 36 for support beneath the flexible conduit 236.

Although several of the features with regard to other preferred embodiments are not shown with respect to FIG. 12, it should be understood that many of the features are adaptable for use with the embodiment illustrated in FIG. 12. For example, fill material shut-off gates 88 can be provided at each of the separation levels in order to shut off fill material 36 from spillage when the boxlike structure is separated. Also, a dewatering system similar to that described above can be incorporated into the boxlike structure illustrated in FIG. 12.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. An apparatus for laying conduit within a trench, comprising:
    a boxlike structure having end walls and side walls, said boxlike structure being separable into an upper portion and a lower portion and further comprising:
        a fill bin compartment internal of said boxlike structure for receiving fill material and delivering fill material to the bottom of the trench; and
        a conduit laying compartment adjacent said fill bin compartment, said conduit laying compartment permitting the conduit to be fed through said conduit laying compartment to the desired resting position at the bottom of the trench;
    drawing means connected rigidly to said lower portion for grasping and advancing said boxlike structure along the bottom of the trench; said drawing means having a configuration that facilitates application of vertical, longitudinal and lateral forces on said boxlike structure thereby permitting an operator of the apparatus to maneuver said boxlike structure on grade along the bottom of the trench; and
    securing means for securing the upper portion of said boxlike structure to the lower portion, said securing means being capable of disengagement enabling the upper portion to be unconnected and removed from the lower portion while the lower portion remains within the trench thereby permitting the lower portion to be pulled along the bottom of the trench once the upper portion is removed.

2. An apparatus as set forth in claim 1 wherein said drawing means comprises a tow bar disposed in brackets rigidly mounted on the forward end wall of the lower portion of said boxlike structure, said tow bar being spaced from the forward end wall sufficiently to receive in grasping engagement the teeth of a bucket of an operator-controlled excavating implement.

3. An apparatus as set forth in claim 2 wherein the lower portion of said boxlike structure has an angled nose portion for assisting in cutting an on-grade bottom for the trench, and said tow bar is mounted on the end wall of said angled nose portion.

4. An apparatus as set forth in claim 3 wherein said angled nose portion has a floor and said boxlike structure has at least one support gusset disposed between the floor and the end wall of said angled nose portion.

5. An apparatus as set forth in claim 1 wherein said securing means further comprises alignment means for aligning the upper portion of said boxlike structure to the lower portion so that the upper portion rests squarely on the lower portion.

6. An apparatus as set forth in claim 1 wherein said securing means comprises a plurality of engagement members extending below the lower edge of the upper portion of said boxlike structure, and a plurality of corresponding receiving members disposed on the lower portion of the boxlike structure for receiving in nesting engagement said engagement members.

7. An apparatus as set forth in claim 6 wherein each of said engagement members comprises a transverse rod extending between the side walls of said boxlike structure thereby providing support for the side walls.

8. An apparatus as set forth in claim 7 wherein each of said engagement members further comprises U-shaped brackets disposed at each end of said transverse rod and connected to the upper portion of said boxlike structure, and said receiving members comprise U-shaped cups for receiving in nesting engagement said U-shaped brackets.

9. An apparatus as set forth in claim 1 wherein said securing means further comprises a latch assembly for coupling said upper and lower portions of said boxlike structure together in releasable engagement.

10. An apparatus as set forth in claim 1 wherein said boxlike structure further comprises an enclosed compartment adjacent said fill bin compartment, said enclosed compartment being separated from said fill bin compartment by a first interior transverse wall and having a floor along the bottom of said boxlike structure from its forward end wall to said first interior transverse wall.

11. An apparatus as set forth in claim 10 further comprising a dewatering system within said enclosed compartment, said dewatering system comprising:
    a plurality of vent openings disposed on said first interior transverse wall proximate to the bottom of said boxlike structure, said vent openings for permitting the passage of fluids from the trench into said enclosed compartment; and
    suction means disposed within said enclosed compartment for collecting fluid within said enclosed compartment and discharging the collected fluid through an exhaust conduit to a location remote from the trench.

12. An apparatus as set forth in claim 10 further comprising a flexible conduit feed assembly whereby flexible conduit may be fed into the trench for placement at the bottom of the trench.

13. An apparatus as set forth in claim 12 wherein said flexible conduit feed assembly comprises:
    a feed tube extending through said enclosed compartment for receiving and directing flexible conduit from external of the trench to a discharge end at the bottom of the trench; and
    a discharge opening in said first internal transverse wall to which the discharge end of said feed tube is connected, said discharge opening being positioned to provide for aligned discharge of the flexible conduit into the trench.

14. An apparatus as set forth in claim 13 wherein said discharge opening is removable from said first internal transverse wall.

15. An apparatus as set forth in claim 1 wherein said boxlike structure has longitudinal bracing members on the side walls which enhance the rigidity of the side walls.

16. An apparatus as set forth in claim 1 wherein said boxlike structure as steps attached to one of the side walls and descending into said conduit laying compartment for providing manual access to the bottom of the conduit laying compartment.

17. An apparatus as set forth in claim 1 wherein said boxlike structure has a plurality of separations whereby it is capable of being divided into upper and lower portions, each such separation having securing means for securing together the separable portions of said boxlike structure.

18. An apparatus as set forth in claim 1 wherein said fill bin compartment is separated from said conduit laying compartment by a second internal transverse wall and the apparatus further comprises a leveler gate connected to said second internal transverse wall for grading the fill material deposited within the trench to a desired depth and level.

19. An apparatus as set forth in claim 18 further comprising grade indicator means for maintaining the grade and level of the fill material deposited on the bottom of the trench, said grade indicator means comprising:
 a laser transmitter disposed to provide a laser signal at a predetermined level above the desired grade;
 a laser receiver mounted on said boxlike structure for sensing the laser signal from the laser transmitter and determining whether the depth of the trench is above or below the desired grade; and
 a grade adjustment mechanism disposed between said laser receiver and said leveler gate for raising or lowering said leveler gate to adjust for the depth of the trench being above or below the desired grade as determined from the laser signal.

20. An apparatus as set forth in claim 19 wherein said laser transmitter also provides an alignment beam and said boxlike structure further has a target mounted thereon which provides a visual display of the alignment beam whereby the operator of the apparatus can visually determine if the conduit being laid is in alignment and on grade.

21. An apparatus as set forth in claim 1 further comprising a tilt indicator for displaying whether said boxlike structure is tilting from vertical; said tilt indicator comprising a pendulum arm suspended from a pivot point on the forward end wall of said boxlike structure.

22. An apparatus as set forth in claim 1 further comprising a shut-off gate disposed within the upper portion of said boxlike structure and capable of being extended into said fill bin compartment to block the delivery of fill material into the lower portion of the boxlike structure, thereby preventing spillage of fill material when the upper portion of said boxlike structure is removed from the lower portion.

23. An apparatus as set forth in claim 1 further comprising a conduit lowering assembly for lowering conduit into said conduit laying compartment; said conduit lowering assembly comprising:
 grasping means for grasping conduit to be lowered into said conduit laying compartment; and
 conveyance means attached to said boxlike structure for delivering said grasping means to the bottom of the trench and aligning the conduit within said boxlike structure.

24. An apparatus as set forth in claim 23 wherein said grasping means has at least one releasable clamp which secures the conduit within the grasping means by clamping engagement.

25. An apparatus as set forth in claim 24 wherein said grasping means further comprises:
 a guide tube to which said releasable clamp is connected;
 a sliding member disposed within said guide tube in longitudinal sliding engagement; said sliding member having a hook at one end thereof for supporting one end of the conduit; and
 suspension means connected to said guide tube for holding said grasping means as it is lowered into said conduit laying compartment.

26. An apparatus as set forth in claim 25 wherein said sliding member further comprises a centering guide which rests on the next previously laid conduit to assist in aligning the conduit being laid, said centering guide having arms which rest on and stabilize the next previously laid conduit so that the conduit being laid may be aligned and set.

27. An apparatus as set forth in claim 25 wherein said sliding member further comprises a trigger which protrudes from said sliding member; said trigger engages and actuates said releasable clamp to release the conduit from clamping engagement as the conduit is longitudinally advanced forward causing said sliding member to slide within said guide tube.

28. An apparatus as set forth in claim 23 wherein said conveyance means comprises:
 a pair of rails secured to the inside of one of the side walls of said boxlike structure; and
 a lowering member engaging said rails in moveable engagement; said lowering member having support arms for supporting said grasping means as the conduit is lowered into said conduit laying compartment.

29. An apparatus as set forth in claim 28 wherein said support arms have centering notches which support said grasping means such that the conduit is aligned within said boxlike structure.

30. An apparatus as set forth in claim 18 further comprising a fill notching assembly for creating a notch in the fill material laid at the bottom of the trench to accommodate the bell portion of a conduit.

31. An apparatus as set forth in claim 30 wherein said fill notching assembly comprises a notching gate connected to said leveler gate and being capable of extending below the lower edge of said leveler gate thereby cutting a notch in the fill material laid at the bottom of the trench.

32. An apparatus as set forth in claim 31 wherein said fill notching assembly further comprises a roller mechanism spaced from said notching gate and connected to said boxlike structure, said roller mechanism for engaging the top surface of one of the conduits which has been laid in rolling engagement such that when the bell of a conduit is encountered by said roller mechanism a signal is conveyed on said notching gate which actuates said notching gate to extend below the lower edge of said leveler gate thereby cutting a bell-accommodating notch in the fill material.

33. An apparatus as set forth in claim 1 further comprising circuit setting means for advancing the conduit being laid into setting engagement with the next previously laid conduit.

34. An apparatus as set forth in claim 33 wherein said conduit setting means comprises a push arm connected to said boxlike structure and a power source connected to said push arm; said push arm for applying a pushing force supplied by said power source to a conduit disposed on the bottom of the trench thereby advancing the conduit being laid into setting engagement with the next previously laid conduit.

35. An apparatus for laying conduit within a trench, comprising:

a boxlike structure having end walls, first and second interior walls, and said walls said boxlike structure being separable into an upper portion and a lower portion and further comprising:
    a fill bin compartment internal of said boxlike structure and defined by the first and second interior walls and the side walls; said fill bin compartment having a loading portion for receiving fill material and a chute portion for delivering fill material from the loading portion to the bottom of the trench;
    a conduit laying compartment adjacent said fill bin compartment and defined by the second interior wall, the rear end wall and the side walls; said conduit laying compartment permitting the conduit to be fed through said conduit laying compartment to the desired resting position at the bottom of the trench, and
    an enclosed compartment adjacent said fill bin compartment and defined by the forward end wall, the first internal wall and the side walls; said enclosed compartment having a floor extending along the bottom of said boxlike structure from the forward end wall to the first interior wall;
    a tow bar disposed in brackets rigidly mounted on the forward end wall of the lower portion of said boxlike structure, said tow bar being spaced from the forward end wall sufficiently to receive in grasping engagement teeth of a bucket of an operator-controlled excavating implement; and
    securing means for securing the upper portion of said boxlike structure to the lower portion, said securing means being capable of disengagement enabling the upper portion to be unconnected and removed from the lower portion while the lower portion remains within the trench thereby permitting the lower portion to be pulled along the bottom of the trench once the upper portion is removed.

36. An apparatus as set forth in claim 35 wherein said enclosed compartment is configured to have an angled nose portion at the forward end wall for assisting in cutting an on-grade bottom for the trench, and said two bar is mounted on the forward end wall of said angled nose portion.

37. An apparatus as set forth in claim 36 wherein said enclosed compartment has at least one support gusset disposed between said floor and the forward end wall of said angle nose portion.

38. An apparatus as set forth in claim 35 wherein said securing means comprises a plurality of engagement members extending below the lower edge of the upper portion of said boxlike structure, and a plurality of corresponding receiving members disposed on the lower portion of the boxlike structure for receiving in nesting engagement said engagement members.

39. An apparatus as set forth in claim 38 wherein each of said engagement members comprises a transverse rod extending between the side walls of said boxlike structure thereby providing support for the side walls.

40. An apparatus as set forth in claim 39 wherein each of said engagement members further comprises U-shaped brackets disposed at each end of said traverse rod and connected to the upper portion of said boxlike structure, and said receiving members comprise U-shaped cups for receiving in nesting engagement said U-shaped brackets.

41. An apparatus as set forth in claim 35 wherein said securing means further comprises a latch assembly for coupling said upper and lower portions of said boxlike structure together in releasable engagement.

42. An apparatus as set forth in claim 35 further comprising a dewatering system within said enclosed compartment, said dewatering system comprising:
    a plurality of vent openings on the first interior wall proximate to the bottom of said boxlike structure, said vent openings for permitting the passage of fluids from the trench into said enclosed compartment; and
    suction means disposed within said enclosed compartment for collecting fluid within said enclosed compartment and discharging the collected fluid through an exhaust conduit to a location remote from the trench.

43. An apparatus as set forth in claim 42 wherein said suction means comprises a suction pump.

44. An apparatus as set forth in claim 35 further comprising a flexible conduit feed assembly whereby flexible conduit may be fed into the trench for placement at the bottom of the trench.

45. An apparatus as set forth in claim 44 wherein said flexible conduit feed assembly comprises:
    a feed tube extending through said enclosed compartment for receiving and directing flexible conduit from external of the trench to a discharge end at the bottom of the trench; and
    a discharge opening in said first interior transverse wall to which the discharge end of said feed tube is connected, said discharge opening being positioned to provide for aligned discharge of the flexible conduit into the trench.

46. An apparatus as set forth in claim 45 wherein said discharge opening is removable from the first interior wall.

47. An apparatus as set forth in claim 35 wherein said boxlike structure has longitudinal bracing members on the side walls which enhance the rigidity of the side walls.

48. An apparatus as set forth in claim 35 wherein said boxlike structure has steps attached to one of the side walls and descending into said conduit laying compartment for providing manual access to the bottom of the conduit laying compartment.

49. An apparatus as set forth in claim 35 wherein said boxlike structure has a plurality of separations whereby it is capable of being divided into upper and lower portions, each such separation having securing means for securing together the separable portions of said boxlike structure.

50. An apparatus as set forth in claim 35 further comprising a leveler gate connected to the second interior wall for grading the fill material deposited within the trench to a desired depth and level.

51. An apparatus as set forth in claim 50 further comprising grade indicator means for maintaining the grade and level of the fill material deposited on the bottom of the trench; said grade indicator means comprising:
    a laser transmitter disposed to provide a laser signal at a predetermined level above the desired grade;
    a laser receiver mounted on said boxlike structure for sensing the laser signal from the laser transmitter and determining whether the depth of the trench is above or below the desired grade; and
    a grade adjustment mechanism disposed between said laser receiver and said leveler gate for raising or lowering said leveler gate to adjust for the depth of the trench being above or below the desired grade as determined from the laser signal.

52. An apparatus as set forth in claim 19 wherein said laser transmitter also provides an alignment beam and said boxlike structure further has a target mounted thereon which provides a visual display of the alignment beam whereby the operator of the apparatus can visually determine if the conduit being laid is in alignment and on grade.

53. An apparatus as set forth in claim 35 further comprising a tilt indicator for displaying whether said boxlike structure is tilting from vertical; said tilt indicator comprising a pendulum arm suspended from a pivot point on the forward end wall of said boxlike structure.

54. An apparatus as set forth in claim 35 further comprising a shut-off gate disposed within the upper portion of said boxlike structure and capable of being extended into said fill bin compartment to block the delivery of fill material into the lower portion of the boxlike structure, thereby preventing spillage of fill material when the upper portion of said boxlike structure is removed from the lower portion.

55. An apparatus as set forth in claim 35 further comprising a conduit lowering assembly for lowering conduit into said conduit laying compartment; said conduit lowering assembly comprising:
   grasping means for grasping conduit to be lowered into said conduit laying compartment; and
   conveyance means attached to said boxlike structure for delivering said grasping means to the bottom of the trench and aligning the conduit within said boxlike structure.

56. An apparatus as set forth in claim 55 wherein said grasping means has at least one releasable clamp which secures the conduit within the grasping means by clamping engagement.

57. An apparatus as set forth in claim 56 wherein said grasping means further comprises:
   a guide tube to which said releasable clamp is connected;
   a sliding member disposed within said guide tube in longitudinal sliding engagement; said sliding member having a hook at one end thereof for supporting one end of the conduit; and
   suspension means connected to said guide tube for holding said grasping means as it is lowered into said conduit laying compartment.

58. An apparatus as set forth in claim 57 wherein said sliding member further comprises a centering guide which rests on the next previously laid conduit to assist in aligning the conduit being laid; said centering guide having arms which rest on and stabilize the next previously laid conduit so that the conduit being laid may be aligned and set.

59. An apparatus as set forth in claim 58 wherein said sliding member further comprises a trigger which protrudes from said sliding member; said trigger engages and actuates said releasable clamp to release the conduit from clamping engagement as the conduit is longitudinally advanced forward causing said sliding member to slide within said guide tube.

60. An apparatus as set forth in claim 55 wherein said conveyance means comprises:
   a pair of rails secured to the inside of one of the side walls of said boxlike structure; and
   a lowering member engaging said rails in moveable engagement; said lowering member having support arms for supporting said grasping means as the conduit is lowered into said conduit laying compartment.

61. An apparatus as set forth in claim 60 wherein said support arm have centering notches which support said grasping means such that the conduit is aligned within said boxlike structure.

62. An apparatus as set forth in claim 50 further comprising a fill notching assembly for creating a notch in the fill material laid at the bottom of the trench to accommodate the bell portion of a conduit.

63. An apparatus as set forth in claim 62 wherein said fill notching assembly comprises a notching gate connected to said leveler gate and being capable of extending below the lower edge of said leveler gate thereby cutting a notch in the fill material laid at the bottom of the trench.

64. An apparatus as set forth in claim 63 wherein said fill notching assembly further comprises a roller mechanism spaced from said notching gate and connected to said boxlike structure, said roller mechanism for engaging the top surface of one of the conduits which has been laid in rolling engagement such that when the bell of a conduit is encountered by said roller mechanism a signal is conveyed to said notching gate which actuates said notching gate to extend below the lower edge of said leveler gate thereby cutting a bell-accommodating notch in the fill material.

65. An apparatus as set forth in claim 35 further comprising conduit setting means for advancing the conduit being laid into setting engagement with the next previously laid conduit.

66. An apparatus as set forth in claim 65 wherein said conduit setting means comprises a push arm connected to said boxlike structure and a power source connected to said push arm; said push arm for applying a pushing force supplied by said power source to a conduit disposed on the bottom of the trench thereby advancing the conduit being laid into setting engagement with the next previously laid conduit.

67. A conduit laying apparatus including a grade maintaining system comprising:
   a boxlike structure having end walls and said walls, said boxlike structure being separable into an upper portion and a lower portion and further comprising:
      a fill bin compartment internal of said boxlike structure for receiving fill material and delivering fill material to the bottom of the trench; and
      a conduit laying compartment adjacent said fill bin compartment, said conduit laying compartment permitting the conduit to be fed through said conduit laying compartment to the desired resting position at the bottom of the trench;
   securing means for securing the upper portion of said boxlike structure to the lower portion, said securing means being capable of disengagement enabling the upper portion to be unconnected and removed from the lower portion while the lower portion remains within the trench thereby permitting the lower portion to be pulled along the bottom of the trench once the upper portion is removed;
   a laser transmitter disposed to provide a laser signal at a predetermined level above the desired grade;
   a laser receiver mounted on the boxlike structure for sensing the laser signal from the laser transmitter and determining whether the depth of the trench is above or below the desired grade; and drawing means connected to the boxlike structure for grasping and advancing the boxlike structure along the bottom of the trench, said drawing means having a configuration that facilitates application of vertical, longitudinal and lateral forces on the boxlike structure thereby permitting an operator of the conduit laying apparatus to maneuver the boxlike structure on grade along the bottom of the trench.

68. A conduit laying apparatus as set forth in claim 67 wherein the boxlike structure has a floor and an angled nose portion for assisting in cutting an on-grade bottom for the trench.

69. A conduit laying apparatus as set forth in claim 67 further comprising a leveler gate connected to the boxlike structure for grading the fill material deposited within the trench to a desired depth and level.

70. A conduit laying apparatus as set forth in claim 69 further comprising a grade adjustment mechanism disposed between said laser receiver and said leveler gate to actuate the leveler gate to adjust for the depth of the trench being above or below the desired grade as determined from the laser signal.

71. A conduit laying apparatus as set forth in claim 67 wherein said laser transmitter also provides an alignment beam and the boxlike structure further has a target mounted thereon which provides a visual display of the alignment beam whereby the operator of the apparatus can visually determine if the conduit being laid is in alignment and on grade.

72. A conduit laying apparatus as set forth in claim 67 further comprising a tilt indicator for displaying whether the boxlike structure is tilting from vertical; said tilt indicator comprising a pendulum arm suspended from a pivot point on the forward end wall of the boxlike structure.

73. An apparatus for laying conduit within a trench, comprising:
  a boxlike structure having end walls and side walls, said boxlike structure being separable into an upper portion and a lower portion and further comprising:
    a fill bin compartment internal of said boxlike structure for receiving fill material and delivering fill material to the bottom of the trench; and
    a conduit laying compartment adjacent said fill bin compartment, said conduit laying compartment permitting the conduit to be fed through said conduit laying compartment to the desired resting position at the bottom of the trench, and comprising grasping means for grasping conduit to be lowered into said conduit laying compartment, and conveyance means attached to said boxlike structure for delivering said grasping means to the bottom of the trench and aligning the conduit within said boxlike structure;
  drawing means connected rigidly to said lower portion for grasping and advancing said boxlike structure along the bottom of the trench, said drawing means having a configuration that facilitates application of vertical, longitudinal and lateral forces on said boxlike structure thereby permitting an operator of the apparatus to maneuver said boxlike structure on grade along the bottom of the trench; and
  securing means for securing the upper portion of said boxlike structure to the lower portion, said securing means being capable of disengagement enabling the upper portion to be unconnected and removed from the lower portion while the lower portion remains within the trench thereby permitting the lower portion to be pulled along the bottom of the trench once the upper portion is removed.

74. An apparatus for laying conduit within a trench as set forth in claim 73 wherein said grasping means has at least one releasable clamp which secures the conduit within the grasping means by clamping engagement.

75. An apparatus for laying conduit within a trench as set forth in claim 74 wherein said grasping means further comprises:
  a guide tube to which said releasable clamp is connected;
  a sliding member disposed within said guide tube in longitudinal sliding engagement; said sliding member having a hook at one end thereof for supporting one end of the conduit; and
  suspension means connected to said guide tube for holding said grasping means at it is lowered into the conduit compartment.

76. An apparatus for laying conduit within a trench as set forth in claim 75 wherein said sliding member further comprises a centering guide which rests on the next previously laid conduit to assist in aligning the conduit being laid; said centering guide having arms which rest on and stabilize the next previously laid conduit so that the conduit being laid may be aligned and set.

77. An apparatus for laying conduit within a trench as set forth in claim 75 wherein said sliding member further comprises a trigger which protrudes from said sliding member; said trigger engages and actuates said releasable clamp to release the conduit from clamping engagement as the conduit is advanced longitudinally forward causing said sliding member to slide within said guide tube.

78. An apparatus for laying conduit within a trench as set forth in claim 73 wherein said conveyance means comprises:
  a pair of rails secured to the inside of one of the side walls of the boxlike structure; and
  a lowering member engaging said rails in moveable engagement; said lowering member having support arms for supporting said grasping means as the conduit is lowered into the conduit laying compartment.

79. An apparatus for laying conduit within a trench as set forth in claim 78 wherein said support arms have centering notches which support said grasping means such that the conduit is aligned within the boxlike structure.

80. A fill material notching assembly for a conduit laying apparatus for creating a notch in the fill material deposited at the bottom of a trench to accommodate the bell portion of a conduit, said fill material notching assembly comprising:
  a notching gate connected to the conduit laying apparatus and disposed near the top surface of the fill material deposited at the bottom of trench, said notching gate being capable of extending below the top surface of the fill material thereby cutting a notch therein; and
  a roller mechanism spaced from notching gate and connected to the conduit laying apparatus, said roller mechanism for engaging the top surface of one of the conduits which has been laid in rolling engagement such that when the bell of a conduit is encountered by said roller mechanism a signal is conveyed to said notching gate which actuates said notching gate to extend below the top surface of the fill material.

81. A fill material notching assembly as set forth in claim 80 wherein said signal is conveyed via a sensing ram to a responsive ram which actuates said notching gate.

82. An apparatus for laying conduit within a trench, comprising:
- a boxlike structure having end walls, an interior wall and side walls, said boxlike structure being separable into an upper portion and a lower portion and further comprising:
  - a fill bin compartment internal of said boxlike structure and defined by the interior wall, the rear end wall, and the side walls; said fill bin compartment having a loading portion for receiving fill material and a chute portion for delivering fill material from the loading portion to the bottom of the trench; and
  - a conduit laying compartment adjacent said fill bin compartment and defined by the interior wall, the forward end wall and the side walls, said conduit laying compartment permitting the conduit to be fed through said conduit laying compartment to the desired resting position at the bottom of the trench;
- drawing means connected rigidly to said lower portion for grasping and advancing said boxlike structure along the bottom of the trench, said drawing means having a configuration that facilitates application of vertical, longitudinal and lateral forces on said boxlike structure thereby permitting an operator of the apparatus to maneuver said boxlike structure on grade and in alignment along the bottom of the trench; and
- securing means for securing the upper portion of said boxlike structure to the lower portion, said securing means being capable of disengagement enabling the upper portion to be unconnected and removed from the lower portion while the lower portion remains within the trench, thereby permitting the lower portion to be pulled along the bottom of the trench once the upper portion is removed.

83. An apparatus as set forth in claim 82 wherein said drawing means comprises a tow bar disposed in brackets rigidly mounted on the forward end wall of the lower portion of said boxlike structure, said tow bar being spaced from the forward end wall sufficiently to receive in grasping engagement the teeth of a bucket of an operator-controlled excavating implement.

84. An apparatus as set forth in claim 83 wherein the lower portion of said boxlike structure has an angled nose portion for assisting in cutting an on-grade bottom for the trench, and said tow bar is mounted on the end wall of said angled nose portion.

85. An apparatus as set forth in claim 84 wherein said angled nose portion has a floor which extends from the forward end wall to the interior wall.

86. An apparatus as set forth in claim 85 further comprising a rocking arm assembly for receiving conduit and directing the conduit for placement within an envelope of fill material, said rocking arm assembly comprising:
- a pivot bar mounted between the floor and the forward end wall of the boxlike structure; and
- a rocking arm having one end pivotally mounted to said pivot bar and its distal end protruding through an opening in said interior wall, through which the conduit is discharged in alignment and on grade.

87. An apparatus as set forth in claim 86 wherein the pivot bar has a plurality of pivot holes and the height of the pivoting end of said rocking arm is adjustable by pivotally mounting said rocking arm to a pivot hole a different height from the floor.

88. An apparatus as set forth in claim 86 wherein the distal end of said rocking arm has a receiving box for directing conduit into the trench on grade and in alignment.

89. An apparatus as set forth in claim 88 wherein the receiving box has a plurality of rollers to assist in directing the conduit into the trench.

90. An apparatus as set forth in claim 88 wherein the receiving box comprises a thimble portion which funnels the conduit into the trench.

91. An apparatus as set forth in claim 86 further comprising grade indicator means for maintaining the conduit on grade within an envelope of fill material deposited on the bottom of the trench, said grade indicator means comprising:
- a laser transmitter disposed to provide a laser signal at a predetermined level above the desired grade;
- a laser receiver mounted on said boxlike structure for sensing the laser signal from the laser transmitter and determining whether the conduit is being discharged at the desired grade level; and
- a grade adjustment mechanism disposed between and connecting said laser receiver and the distal end of said rocking arm for raising or lowering the distal end of said rocking arm to adjust for the disposition of the conduit being above or below the desired grade level as determined from the laser signal.

92. An apparatus as set forth in claim 91 wherein said laser transmitter also provides an alignment beam and said boxlike structure further has a target mounted thereon which provides a visual display of the alignment beam whereby the operator of the apparatus can visually determine if the conduit being laid is in alignment and on grade.

93. An apparatus as set forth in claim 86 wherein said rocking arm has a trough portion which assists in centering the conduit being laid on said rocking arm.

94. An apparatus as set forth in claim 86 wherein said rocking arm has a ram plate disposed near its pivoting end which reciprocates forward and back to push conduit resting on said rocking arm into setting engagement with the next previously set conduit.

95. An apparatus as set forth in claim 86 wherein said boxlike structure has inwardly extending baffles extending from the side walls beneath the distal end of said rocking arm, said baffles for windrowing fill material directly beneath the conduit being laid.

96. A method for laying conduit in a trench comprising the steps of:
(a) providing a conduit laying apparatus having a boxlike structure which defines a fill bin compartment and a conduit laying compartment, said boxlike structure having an angled nose portion and a tow bar connected to said angled nose portion;
(b) excavating an initial length of trench of sufficient depth and length to permit placement of the boxlike structure therein;
(c) placing the boxlike structure within the initial length of trench and setting the boxlike structure on grade using an above ground laser transmitter and a laser receiver mounted on the boxlike structure;

(d) filling the fill bin compartment with fill material for deposit in a layer on the bottom of the trench;

(e) placing the initial conduit on the layer of fill material;

(f) excavating forward of the boxlike structure sufficient ground to permit advancement of the boxlike structure;

(g) pulling the boxlike structure forward by grasping the tow bar and applying a longitudinal pulling force; said pulling causes the boxlike structure to deposit a layer of fill material on the bottom of the trench;

(h) adjusting the application of vertical and lateral forces on the boxlike structure to assure that the pulling of the boxlike structure is done on grade and in alignment;

(i) placing the next conduit on the layer of fill material and setting it engagingly with the next previously laid conduit; and (j) repeating steps (f) through (i).

97. A method as set forth in claim 96 wherein the step of filling the fill bin compartment is repeated as needed.

98. A method as set forth in claim 96 wherein steps (e) and (i) comprise the steps of lowering the conduit into the conduit laying compartment, and positioning the conduit on the fill material in proper alignment.

99. A method as set forth in claim 98 wherein the step of lowering the conduit into the conduit laying compartment comprises:

grasping the conduit by use of a grasping mechanism having a guide tube, at least one releasable clamp connected to the guide tube, and a sliding member disposed within said guide tube in longitudinal sliding engagement, said sliding member having a hook at one end thereof for supporting one end of the conduit;

placing the grasping mechanism on a conveyance mechanism having a pair of rails secured to an inside wall of the boxlike structure and a lowering member movable along the rails;

aligning the conduit by placing the grasping mechanism on centering notches in support arms of the lowering member;

lowering the lowering member along the rails thereby delivering the conduit in alignment to the bottom of the trench; and releasing the conduit from the grasping mechanism.

100. A method as set forth in claim 96 wherein prior to step (i) said method further comprises the step of creating a notch in the fill material to accommodate the bell of the conduit.

101. A method as set forth in claim 100 wherein the step of creating a notch comprises actuating a notching gate connected to the boxlike structure which extends below the surface of the fill material by transmitting a signal from a roller mechanism in rolling engagement with the surface of a previously laid conduit.

102. A method as set forth in claim 96 wherein step (h) comprises lifting up while pulling on the tow bar to adjust the boxlike structure when the laser receiver indicates that the boxlike structure is below grade.

103. A method as set forth in claim 96 wherein step (h) comprises pushing down while pulling on the tow bar to adjust the boxlike structure when the laser receiver indicates that the boxlike structure is above grade.

104. A method as set forth in claim 96 further comprising the step of maintaining alignment of the boxlike structure during step (g).

105. A method as set forth in claim 104 wherein the laser transmitter also provides an alignment beam and the boxlike structure has a target mounted thereon which provides a visual display of the alignment beam and the step of maintaining alignment comprises maintaining the visual display of the alignment beam on the target within a close proximity to the center of the target.

106. A method for laying conduit using a conduit laying apparatus in a trench when an obstacle is encountered within the trench, said method comprising the steps of:

(a) providing in the trench a conduit laying apparatus having a boxlike structure which is capable of separation into an upper portion and a lower portion; said boxlike structure having a tow bar connected to the forward end of the boxlike structure;

(b) releasing the upper portion from secure engagement with the lower portion when an obstacle is encountered;

(c) lifting the upper portion from engagement with the lower portion and removing the upper portion from the trench;

(d) excavating forward of the lower portion of the boxlike structure and around the obstacle;

(e) pulling the lower portion of the boxlike structure forward and beneath the obstacle by grasping the tow bar and applying a pulling force;

(f) positioning conduit within the lower portion of the boxlike structure and on the bottom of the trench;

(g) pulling the lower portion of the boxlike structure clear of the obstacle;

(h) lowering the upper portion of the boxlike structure into the trench and into aligned engagement with the lower portion of the boxlike structure; and (i) securing the upper portion of the boxlike structure to the lower portion of the boxlike structure.

107. A method for laying conduit when encountering an obstacle within the trench as set forth in claim 106 wherein step (b) comprises disengaging latches which are provided to secure the upper portion of the boxlike structure to the lower portion.

108. A method for laying conduit when encountering an obstacle within the trench as set forth in claim 106 wherein the boxlike structure has a fill bin compartment for receiving fill material and delivering the fill material in a layer at the bottom of the trench and the upper portion of the boxlike structure has a shut-off gate to prevent passage of fill material from the upper portion to the lower portion of the boxlike structure, and said method further comprises the step of closing the shut-off gate prior to step (c).

109. A method for laying conduit when encountering an obstacle within the trench as set forth in claim 106 wherein the lower portion of step (f) comprises lowering the conduit into the boxlike structure and aligning the conduit on the bottom of the trench.

110. A method for laying conduit when encountering an obstacle within the trench as set forth in claim 106 wherein the upper portion of the boxlike structure has a plurality of engagement members extending beyond its lower edge and the lower portion of the boxlike structure has a corresponding plurality of receiving members and step (h) comprises engagingly nesting the engagement members in the receiving members.

111. A method for laying conduit when encountering an obstacle within the trench as set forth in claim 110 wherein the engagement members comprise pairs of U-shaped brackets with rods disposed therebetween and receiving members comprise U-shaped cups and step (h) comprises engagingly nesting the U-shaped brackets in the U-shaped cups.

112. A method for simultaneously laying flexible conduit and conduit within a trench comprising the steps of:
- (a) providing in a trench a conduit laying apparatus having a boxlike structure which defines a fill bin compartment and a conduit laying compartment, said boxlike structure further having a tow bar connected to the forward end of the boxlike structure and a feed tube extending from the top of the boxlike structure and opening into the conduit laying compartment at the base of the fill bin compartment;
- (b) filling the fill bin compartment with fill material for deposit of a fill material layer on the bottom of the trench;
- (c) excavating forward of the boxlike structure thereby permitting advancement of the boxlike structure within the trench;
- (d) pulling the boxlike structure forward by grasping the tow bar and applying pulling force thereto;
- (e) feeding flexible conduit into the feed tube for aligned disposition within the layer of fill material and positioning conduit on the layer of fill material;
- (f) repeating steps (c) through (e).

113. A method for simultaneously laying flexible conduit and conduit as set forth in claim 112 wherein step (b) is repeated as needed.

114. A method for simultaneously laying flexible conduit and conduit as set forth in claim 112 wherein step (e) comprises the steps of lowering the conduit into the conduit laying compartment, and positioning the conduit on the fill material in proper alignment.

115. A method for simultaneously laying flexible conduit and conduit as set forth in claim 114 wherein the step of lowering the conduit into the conduit laying compartment comprises:

grasping the conduit by use of a grasping mechanism having a guide tube, at least one releasable clamp connected to the guide tube, and a sliding member disposed within said guide tube in longitudinal sliding engagement, said sliding member having a hook at one end thereof for supporting one end of the conduit;

placing the grasping mechanism on a conveyance mechanism having a pair of rails secured to an inside wall of the boxlike structure and a lowering member movable along the rails;

aligning the conduit by placing the grasping mechanism on centering notches in support arms of the lowering member;

lowering the lowering member along the rails thereby delivering the conduit in alignment to the bottom of the trench; and releasing the conduit from the grasping mechanism.

116. A method for simultaneously laying flexible conduit and conduit as set forth in claim 112 wherein prior to step (e) said method further comprises the step of creating a notch in the fill material to accommodate the bell of the conduit.

117. A method for simultaneously laying flexible conduit and conduit as set forth in claim 116 wherein the step of creating a notch comprises actuating a notching gate connected to the boxlike structure which extends below the surface of the fill material by transmitting a signal from a roller mechanism in rolling engagement with the surface of a previously laid conduit.

118. A method for removing fluid seeping into a conduit laying apparatus disposed within a trench comprising the steps of:
- (a) providing a conduit laying apparatus having a boxlike structure which has an end wall, an interior wall and a floor defining an enclosed compartment; said interior wall having a plurality of vent openings disposed near the floor and the enclosed compartment having a suction mechanism disposed within;
- (b) placing the boxlike structure within the trench wherein ground fluid seeps into the boxlike structure;
- (c) permitting the fluid to pass through the vent openings into the enclosed compartment;
- (d) collecting the fluid from within the enclosed compartment in the suction mechanism; and
- (e) discharging the collected fluid through an exhaust conduit to a location remote from the trench.

119. A method for removing seepage fluid as set forth in claim 118 wherein the suction mechanism is a suction pump disposed within the enclosed compartment and step (d) comprises suctioning up fluid from within the enclosed compartment.

120. A method for removing seepage fluid as set forth in claim 118 wherein step (e) comprises pumping the collected fluid through the exhaust conduit for discharge at a location remote from the trench.

121. A method for removing seepage fluid as set forth in claim 118 wherein the suction mechanism comprises a suction screen disposed within the enclosed department which is connected to the exhaust conduit and step (d) comprises suctioning fluid through the suction screen and exhaust conduit.

122. A method for laying conduit in a trench comprising the steps of:
- (a) providing a conduit laying apparatus having a boxlike structure which defines a fill bin compartment and a conduit laying compartment, said boxlike structure having an angled nose portion and a tow bar connected to the angled nose portion, and the conduit laying compartment having a rocking arm pivotally mounted in the angled nose portion and having a distal end from which conduit is discharged from the trench;
- (b) excavating an initial length of trench of sufficient depth and length to permit placement of the boxlike structure therein;
- (c) placing the boxlike structure within the initial length of trench and setting the boxlike structure on grade using a laser transmitter disposed above grade and a laser receiver mounted on the boxlike structure;
- (d) placing the initial conduit on the rocking arm for disposition within a layer of fill material;
- (e) filling the fill bin compartment with fill material for deposit in a layer on the bottom of the trench;
- (f) excavating forward of the boxlike structure sufficient ground to permit advancement of the boxlike structure;
- (g) pulling the boxlike structure forward by grasping the tow bar and applying a pulling force; said pulling causes the boxlike structure to deposit a layer of fill material on the bottom of the trench and around the conduit;
(h) adjusting the application of vertical and lateral forces on the boxlike structure to assure that the pulling of the boxlike structure is done on grade and in alignment;
(i) placing the next conduit on the rocking arm for setting engagement with the next previously laid conduit and setting it engagingly with the next previously laid conduit; and
(j) repeating steps (f) through (i).

123. A method as set forth in claim 122 wherein the step of filling the fill bin compartment is repeated as needed.

124. A method as set forth in claim 122 wherein the laying of conduit is maintained on grade by sensing a signal transmitted from the laser transmitter to the laser receiver, determining whether the signal indicates whether the signal is being laid above or below grade, and raising or lowering the distal end of the rocking arm to compensate for any amount that conduit is being laid above or below grade.

125. A method as set forth in claim 122 wherein the thickness of the fill material beneath the conduit being laid can be adjusted by moving the pivotal mount for the rocking arm.

126. A method as set forth in claim 122 wherein fill material is deposited beneath the conduit being laid by windrowing the fill material beneath the conduit using baffles mounted to the boxlike structure.

* * * * *

UNITED STATES PATENT AND TRADEMARK OFFICE
CERTIFICATE OF CORRECTION

PATENT NO. : 4,714,381
DATED : December 22, 1987
INVENTOR(S) : G. Brent Hatch

It is certified that error appears in the above-identified patent and that said Letters Patent is hereby corrected as shown below:

```
Col. 1, line 60, "fee" should be --feet--
Col. 1, line 62, "heay" should be --heavy--
Col. 2, line 61, "trench" should be --trencher--
Col. 3, line 1, "19871" should be --1971--
Col. 3, line 30, "Furlther" should be --Further--
Col. 4, line 10, "surfsace" should be --surface--
Col. 4, line 23, "titled" should be --tilted--
Col. 5, lines 18-19, "and-/or" should be --and/or--
Col. 6, line 23, "to" should be --of--
Col. 9, line 2, "film" should be --fill--
Col. 10, line 17, "in" should be --is--
Col. 10, line 43, "side" should be --slide--
Col. 10, line 47, "two" should be --tow--
Col. 11, line 30, "escavating" should be --excavating--
Col. 11, line 31, "escavate" should be --excavate--
Col. 11, line 54, delete "it"
Col. 12, line 14, "2" should be --12--
Col. 16, line 38, "transmitter-/" should be --transmitter/--
Col. 18, line 30, "to" should be --on--
Col. 20, line 32, delete "a"
Col. 22, line 65, "as" should be --has--
```

UNITED STATES PATENT AND TRADEMARK OFFICE
CERTIFICATE OF CORRECTION

PATENT NO. : 4,714,381

DATED : December 22, 1987

INVENTOR(S) : G. Brent Hatch

Page 2 of 2

It is certified that error appears in the above-identified patent and that said Letters Patent is hereby corrected as shown below:

Col. 25, line 2, "and said" should be --and side--
Col. 25, line 64, "traverse" should be --transverse--
Col. 28, line 43, "said" should be --side--

Signed and Sealed this

Twenty-fourth Day of May, 1988

*Attest:*

DONALD J. QUIGG

*Attesting Officer*  *Commissioner of Patents and Trademarks*